(12) United States Patent
Schatz et al.

(10) Patent No.: US 7,230,048 B1
(45) Date of Patent: Jun. 12, 2007

(54) PROCESS FOR CONTINUOUS PRODUCTION OF REACTIVE POLYMERS WITH IN-LINE POST-MODIFICATION AND PRODUCTS THEREOF

(75) Inventors: David D. Schatz, Racine, WI (US); Warunee Srisiri-Sisson, Charleston, SC (US); Marco A. Villalobos, Racine, WI (US); Michihiro Kaai, Toyoake (JP); Yasuhiko Mori, Nagoya (JP)

(73) Assignee: BASF Corporation, Mount Olive, NJ (US)

( * ) Notice: Subject to any disclaimer, the term of this patent is extended or adjusted under 35 U.S.C. 154(b) by 1428 days.

(21) Appl. No.: 09/648,848

(22) Filed: Aug. 25, 2000

(51) Int. Cl.
*C08F 8/00* (2006.01)
*C08G 63/12* (2006.01)

(52) U.S. Cl. .............. 525/53; 525/293; 525/328.2; 525/329.4; 525/374; 525/384; 525/385; 525/386; 526/88; 526/320; 528/272; 528/295.5

(58) Field of Classification Search .............. 525/53, 525/293, 328.2, 329.4, 374, 384, 385, 386; 528/272, 295.5; 526/88, 320
See application file for complete search history.

(56) References Cited

U.S. PATENT DOCUMENTS

| 3,919,146 A | 11/1975 | Emmons |
| 3,974,303 A | 8/1976 | Iwase et al. |
| 4,064,161 A | 12/1977 | Lewis et al. |
| 4,208,313 A | 6/1980 | Lewis et al. |
| 4,233,362 A | 11/1980 | Novak et al. |
| 4,242,243 A | 12/1980 | Antonelli et al. |
| 4,303,565 A | 12/1981 | Tobias |
| RE31,309 E | 7/1983 | Antonelli et al. |
| 4,845,012 A | 7/1989 | Seko et al. |
| 5,130,369 A * | 7/1992 | Hughes et al. .............. 524/846 |
| 5,326,820 A | 7/1994 | Hoffmann et al. |
| 5,484,850 A | 1/1996 | Kempter et al. |
| 5,558,911 A | 9/1996 | Blum |
| 5,763,546 A | 6/1998 | Jung et al. |
| 6,433,098 B1 * | 8/2002 | Brown et al. .............. 525/274 |

FOREIGN PATENT DOCUMENTS

| EP | 1 044 991 A1 | 10/2000 |
| GB | 2 005 282 A | 4/1979 |
| WO | WO 91/09888 | 7/1991 |
| WO | WO 93/25596 | 12/1993 |

OTHER PUBLICATIONS

Database WPI, Section Ch. Week 199538, Derwent Publications Ltd., London, GB; AN 1995-290429, XP002194528 & JP 07 188306 A (Mitsubishi Rayon Co., Ltd.), Jul. 25, 1995 abstract.

* cited by examiner

*Primary Examiner*—Fred Teskin
(74) *Attorney, Agent, or Firm*—Foley & Lardner LLP

(57) ABSTRACT

A continuous polymerization process for producing reactive polymers comprises continuously charging into a first reaction zone at least one functional monomer and polymerizing the monomers to produce a first polymeric product having at least one functional group. This first polymeric product is then continuously directly charged into a second reaction zone together with at least one modifier reactant having a functional group that is complementary to the functional group of the first polymeric product. At least a portion of the modifier reactant reacts with at least one of the functional groups of the first polymeric product to produce a second polymeric product which incorporates at least a portion of the modifier reactant, such that the second polymeric product is a reactive polymer.

20 Claims, 2 Drawing Sheets

PROCESS FOR CONTINUOUS PRODUCTION OF REACTIVE POLYMERS WITH IN-LINE POST-MODIFICATION AND PRODUCTS THEREOF

FIELD OF INVENTION

The present invention relates to a continuous process for the production of reactive polymers, to reactive polymers produced by this process, to novel reactive polymers, to coatings and adhesives containing the reactive polymers of the present invention and produced according to the process of the present invention.

BACKGROUND OF THE INVENTION

Various types of reactive polymers have been developed and are known in the art. These reactive polymers are produced by a number of well known methods. These methods generally require the reactive polymers to be produced in a successive series of steps. U.S. Pat. No. 3,974,303, issued to Iwase et al., discusses reactive polymers to use in a specific method of application, and generally teaches how to make such polymers in two separate batches.

In a typical methodology, a first polymeric product is produced that carries reactive functional groups which can react in a subsequent modification reaction to give the reactive polymer. The first polymeric product is generally produced via a continuous, batch, or semi-batch process. The subsequent modification reaction is typically an addition or condensation reaction with a reactant that carries a functional group that can react with the reactive functional group of the first polymeric product to produce a reactive polymer. U.S. Pat. No. 4,064,161, issued to Lewis et al.; U.S. Pat. No. 4,208,313, issued to Lewis et al.; U.S. Pat. No. 4,845,012, issued to Seko et al.; U.S. Pat. No. 5,484,850, issued to Kempter et al. as well as WO 9109888, and WO 9325596, discuss making reactive polymers via batch processes.

U.S. Pat. No. 3,919,146, issued to Emmons; U.S. Pat. No. 4,233,362, issued to Novak et al.; U.S. Pat. No. 4,242,243, issued to Antonelli et al., U.S. Pat. No. 4,303,565, issued to Tobias; and RE 31,309, issued to Antonelli et al. discuss unsaturated polymers where the backbone is formed via free radical mechanisms, and the side chains are unsaturated fatty acid derivatives, using long batch and semi-batch process times. The reaction route for these polymers involves 1) reaction of hydroxyl functional backbones with fatty acids, 2) reaction of carboxylic functional backbones with epoxy fatty acids, or 3) reaction of carboxylic functional backbones with hydroxyethyl fatty acid amine.

After the first polymeric product is produced, a number of processing steps are typically required to prepare the first polymeric product for the modification reaction with subsequent materials to form the reactive polymer. These steps include cooling, dissolving, flaking, milling or otherwise recovering/handling/processing the first polymeric product before it can undergo subsequent modification to form the reactive polymer.

Because of the difficulties above, most reactive polymers are produced via condensation mechanisms, and not free radical mechanisms. For example, the prior art discloses numerous examples of unsaturated polyester and urethane polymers where the reactive modifiers are added during or after the main chain step-polymerization.

There are also a number of patents involving anionic polymerization. Very little prior art teaches the production of the main chain polymer with a free radical mechanism. These prior art processes require two relatively long steps with intermediate polymer recovery in order to produce the final reactive polymer. Furthermore, such prior art methodologies teach batch processing methods. The economic advantages of using a single process are well known. U.S. Pat. No. 5,558,911, issued to Blum, teaches that a single continuous process is preferred to produce finished powder coatings by using a reactor and extruder in a series. However, the reference does not teach or suggest using such a layout to create unsaturated polymers. By requiring additional handling/recovery/processing of the first polymeric product prior to its subsequent modification, the cost and/or difficulties of producing reactive polymers is increased. A need remains for producing reactive polymers via a simple, cost effective method.

SUMMARY OF THE INVENTION

The present invention relates to a continuous polymerization process for producing reactive polymers which advantageously produces reactive polymers in a simple, cost effective method. This process comprises continuously charging into a first reaction zone at least one functional monomer(s) and polymerizing the monomers to produce a first polymeric product having at least one functional group. This first polymeric product is then continuously directly charged into a second reaction zone together with at least one modifier reactant having a functional group that is complementary to the functional group of the first polymeric product. At least a portion of the modifier reactant reacts with at least one of the functional groups of the first polymeric product to produce a second polymeric product which incorporates at least a portion of the modifier reactant, such that the second polymeric product is a reactive polymer.

In one aspect of the present invention, a free radical mechanism is utilized to produce the first polymeric product. Free radical mechanisms advantageously allow for a fast economical route to making the first polymeric product, and are especially conducive to continuous operations.

In another aspect of the present invention, the second reaction zone is free of solvent.

In still another aspect of the present invention, at least one of the functional monomers or modifier reactants is an acrylic monomer.

The invention also relates to reactive polymers produced by the process of the present invention.

Another feature of the present invention is a pressure sensitive labeling adhesive which incorporates one or more of the reactive polymers of the present invention.

A further feature of the present invention is a low cure temperature powder coating which incorporates one or more of the reactive polymers of the present invention.

It is a further feature of the invention to produce unique reactive polymers. One unique reactive polymer consists essentially of a first polymeric product created by free-radical polymerization of unsaturated anhydride(s), α-olefin(s) and optionally styrene(s), with unsaturated side chains attached to the polymeric product, wherein the average functionality is greater than two double bonds per side chain.

A further feature of the invention is a unique reactive polymer that consists essentially of a first polymeric product created by free-radical polymerization of unsaturated anhydride(s), α-olefin(s) and acrylate(s), and unsaturated side chains attached to the first polymeric product. The acrylate(s) comprise greater than 50% by weight of the first polymeric product. The average functionality of the reactive polymer is greater than two double bonds per side chain.

Another aspect of the present invention is an unsaturated reactive polymer capable of undergoing free radical crosslinking consisting essentially of a first polymeric product created by free radical polymerization, the first polymeric product having attached unsaturated side chains. The first polymeric product comprises at least about 55% by weight of one or more styrenics. The average functionality of the reactive polymer is greater than two double bonds per side chain.

A further aspect is a reactive polymer consisting essentially of a first polymeric product and side chains attached to the first polymeric product, the side chains containing unsaturated groups wherein the amount of unsaturation in the unsaturated reactive polymer is greater than 2000 grams per mole unsaturated group. The side chains are selected from the group consisting of acrylic, methacrylic, and allylic functional groups. These novel polymers can be readily processed in end use applications, and require less cure time and/or catalyst than conventional polymers Another aspect of the present invention is a reactive polymer, consisting essentially of a first polymeric product with attached side chains comprising internal double bonds. The first polymeric product has functional groups selected from the group consisting of carboxylic acids and anhydrides. The side chains are added to the first polymeric product by the reaction of the functional groups on the first polymeric product with primary or secondary hydroxyl groups on a modifier reactant. The modifier reactant is selected from the group consisting of monoglycerides and diglycerides.

Another feature of the invention is a reactive polymer, consisting essentially of a first polymeric product with side chains attached. The first polymeric product has functional groups selected from the group consisting of ester and hydroxyl. The side chains are added by a transesterification reaction between the functional groups on the first polymeric product and glycerides.

Still further objects, features and advantages of the invention will be apparent from the following detailed description when taken in conjunction with the appended claims.

BRIEF DESCRIPTION OF THE DRAWINGS

The preferred exemplary embodiment of the invention will hereinafter be described in conjunction with the appended drawings, wherein like numerals denote like elements and.

DETAILED DESCRIPTION OF THE INVENTION

Figure 1:
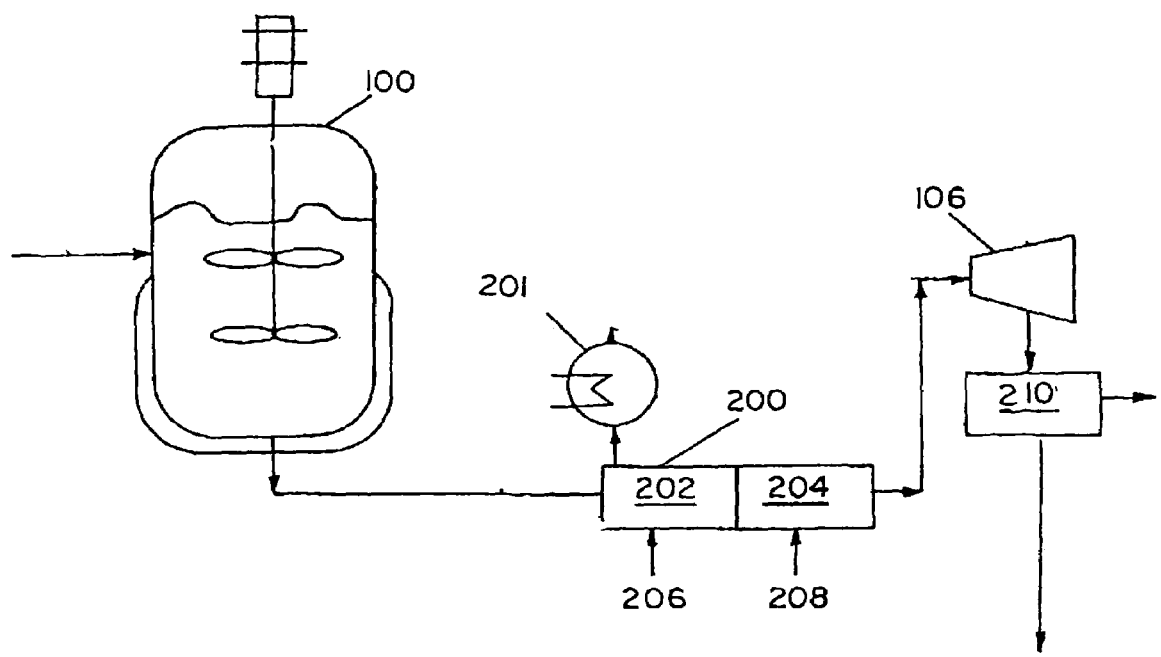
FIG. 1 is a schematic diagram of a polymerization reactor network utilized in the present invention.

In the present application, the following terms are used consistently throughout, and are defined as follows:

Acrylic monomer—any acrylic acid, methacrylic acid, acrylate, or methacrylate monomer or derivative thereof.

Directly charging (charged)—transferring a first polymeric product from a first reaction zone into a second reaction zone without modifying, e.g. cooling, milling, flaking, dissolving, isolating, or otherwise further processing, the first polymeric product prior to its transfer into the second reaction zone. The first polymeric product is subject to devolatization, unless specifically stated to the contrary, before being placed in the second reaction zone.

Functional monomer—a monomer that has a reactive functional group which, following polymerization of the monomer, is capable of reacting with a modifier reactant.

Modifier reactant—a modifier compound that has one or more functional groups capable of reacting with the reactive functional group of the functional monomer.

Reactive polymer—A polymer having reactive groups which may undergo further reaction in a user-controlled manner using heat, UV, chemical, or other specific controllers.

Reactor Zone—any reactor or portion thereof wherein the temperature, feed, mixing, and/or other conditions may be individually controlled.

Solvent—any inert fluid which does not react with the monomers or reactants during polymerization.

The present invention relates to a novel continuous polymerization process for producing reactive polymers. This process comprises continuously charging into a first reaction zone at least one functional monomer and maintaining an effective temperature in the first reaction zone for an effective period of time to cause polymerization of the monomers to produce a first polymeric product having at least one functional group. The first polymeric product is then continuously directly charged into a second reaction zone together with at least one modifier reactant having a functional group that is complementary to the functional group of the first polymeric product. An effective temperature is maintained in the second reaction zone for an effective period of time such that at least a portion of the modifier reactant reacts with at least one of the functional groups of the first polymeric product to produce a second polymeric product which incorporates at least a portion of the modifier reactant, such that the second polymeric product is a reactive polymer. The reactive polymer may contain reactive groups such as unsaturated bonds, or reactive functionalities. These reactive polymers are then further reacted in a controlled manner at a later time.

It has been surprisingly and unexpectedly discovered that the two step process for producing the reactive polymers can be conducted without the need to process the first polymeric product resulting from the first step in any fashion, except for optional devolatization, prior to its subsequent modification into the reactive polymer. This solves a long standing problem in the art, requiring expensive and time consuming processing, handling, recovery, and/or isolation, of the first polymeric product before it could be subsequently modified to form the reactive polymer.

Furthermore, the inventors have surprisingly and unexpectedly discovered that the modification of the first polymeric product can be conducted in the absence of solvent. This advantageously allows for less costly production of the reactive polymer.

All ranges recited herein include all combinations and subcombinations included with that range's limits; therefore, a range from "about 15% to about 60%" would include ranges from about 15% to about 45%, from about 30% to about 47%, etc. A range of "up to 85%" would include up to 80%, up to 50%, up to 24%, etc.

According to the invention, one or more functional monomers are continuously placed into a first reaction zone. These functional monomers may by any suitable monomers having olefinic or vinyl double bonds and a reactive functional group. The reactive functional group is preferably inert under the polymerization conditions within the first reaction zone. However, the process allows for the addition of components that may react with some of the functional group on the functional monomer or the functional group on the first polymeric product. For example, materials such as isopropanol, may be present in the first reaction zone in the preparation of the first polymeric product. As one skilled in the art will recognize, such materials will be present in amounts that are not large enough to react with all the functional groups on the first polymeric product.

Suitable functional monomers include, but are not limited to, acrylic acids, methacrylic acids, maleic acids, acrylates, methacrylates, diacrylates, dimethacrylates, and other such monomers and combinations of monomers. Preferred examples include, but are not limited to, butyl acrylate, 2-ethylhexyl acrylate, ethyl acrylate, methyl acrylate, methyl methacrylate, isobutyl acrylate, isobutyl methacrylate, butyl methacrylate, ethylene glycol diacrylate, ethylene glycol dimethacrylate, 1,6-hexanediol diacrylate, 1-butylaminoethyl methacrylate, 2-chloroethyl methacrylate, 2-ethoxyethyl methacrylate, 2-ethylbutyl methacrylate, 2-ethylhexyl methacrylate, 2-hydroxyethyl methacrylate, 2-hydroxypropyl methacrylate, 2-methoxybutyl methacrylate, 2-n-butoxyethyl methacrylate, 2-nitro-2-methylpropyl methacrylate, 2-phenoxyethyl methacrylate, 2-phenylethyl methacrylate, 2-sulfoethyl methacrylate, 3-methoxybutyl methacrylate, allyl methacrylate, benzyl methacrylate, butylaminoethyl methacrylate, cinnamyl methacrylate, crotyl methacrylate, cyclopentyl methacrylate, ethyl acrylate, ethyl methacrylate, furfuryl methacrylate, hexafluoroisopropyl methacrylate, isoamyl methacrylate, isobutyl methacrylate, isopropyl acrylate, isopropyl methacrylate, methyl 2-cyanoacrylate, methyl acrylate, methyl α-chloroacrylate, n-amyl methacrylate, n-butyl, methacrylate, n-decyl acrylate, n-hexyl methacrylate, N,N-diethylaminoethyl methacrylate, N,N-dimethylaminoethyl methacrylate, n-octyl methacrylate, n-propyl acrylate, n-propyl methacrylate, phenyl methacrylate, sec-butyl-methacrylate, t-butyl methacrylate, tetrahydrofurfuryl methacrylate, tetrahydropyryl methacrylate, trifluoroethyl methacrylate, 2-hydroxy ethyl acrylate, hydroxy propyl acrylate, 3-chloro-2-hydroxy-propyl acrylate, 2-hydroxy-butyl acrylate, 6-hydroxyhexyl acrylate, 2-hydroxymethyl methacrylate, 2-hydroxypropyl methacrylate, 6-hydroxyhexyl methacrylate, and 5,6-dihydroxyhexyl methacrylate.

The functional monomer may also include an anhydride, a ketone, an aldehyde, an epoxy, an amide, an amine, or an isocyanate in place of or in addition to a carboxylic acid, hydroxyl, or ester functional group. Examples of anhydride-containing functional monomers include, but are not limited to, maleic anhydride, itaconic anhydride and citraconic anhydride. Examples of ketone- and aldehyde-containing functional monomers include, but are not limited to, methacrolein, methyl vinyl ketone and acrolein. Examples of epoxy-containing radically-polymerizable monomers for use in the process include, but are not limited to, glycidyl methacrylate, glycidyl acrylate and 4-vinyl-1-cyclohexene 1,2 epoxide. Still other radically-polymerizable monomers containing condensation reactive functionalities include amides such as acrylamide, N-ethyl acrylamide, N,N-diethyl acrylamide, methacrylonitrile, methacrylamide, N-methyl methacrylamide, N-ethyl methacrylamide, N,N-diethyl methacrylamide, N,N-dimethyl methacrylamide, and N-phenyl methacrylamide. Examples of amine-containing radically-polymerizable monomers include, but are not limited to, 2-(diethylamino)ethyl acrylate, 2-(dimethylamino) ethyl acrylate, 2-(dimethylamino)propyl acrylate, 2-(diethylamino)ethyl methacrylate, 2-(dimethylamino)ethyl methacrylate, 2-(dimethylamino)propyl acrylate. Examples of isocyanate-containing monomers include, but are not limited to, 3-isopropenyl-α,α-dimethylbenzyl isocyanate and 2-isocyanatoethyl methacrylate.

The first polymeric product may optionally include one or more monomers that do not contain functional groups but are capable of undergoing free radical polymerization including, but not limited to, dienes, vinyl, or styrenic monomers. When present, these monomers are fed in together with the other functional monomers in an amount of up to 99% by weight based on the weight of the total monomer feed. Styrenic monomers for use in the present invention include, but are not limited to, styrene, α-methylstyrene, vinyl toluene, p-methylstyrene, t-butylstyrene, o-chlorostyrene, vinyl pyridine, and mixtures of these species. Preferred styrenic monomers used in the process include styrene and α-methyl-styrene. Vinyl monomers suitable for the present process include vinyl acetate, and derivatives thereof, such as Veova9 (Shell Chemical), vinyl chloride, olefins, including, but not limited to $C_4$–$C_{28}$ α-olefins (including the Gulftene Line from Chevron Chemical). In one embodiment, vinyl monomers include 1-decene.

In one embodiment, the monomer feed to the first reaction zone comprises about 15% to about 70% by weight, preferably about 30% to about 60% by weight, of an ethylenically unsaturated anhydride, preferably maleic anhydride, the balance of the monomer feed comprising α-olefins, styrenics, and other ethylenically unsaturated monomers and optionally solvent and initiator, such that the resulting first polymeric product is less than about 50% polymerized acrylic monomers. The modifier reactant feed to the second reaction zone is glycidyl acrylate (GA), glycidyl methacrylate (GMA), 2-hydroxyethyl acrylate (HEA), 2-hydroxyethyl methacrylate (HEMA), 2-hydroxypropyl methacrylate (HPMA), unsaturated fatty alcohols, allylic hydroxyl compounds, or combinations thereof. GMA or HEA are used in one embodiment. The modifier is about 5% to about 50% by weight of the feed into the second reactor zone, preferably about 15% to about 35% by weight.

In another embodiment, the monomer feed to the first reaction zone comprises about 15% to about 70% by weight, preferably about 30% to about 60% by weight, ethylenically unsaturated anhydride, preferably maleic anhydride, the balance of the monomer feed comprising α-olefins, and optionally solvent and initiator. The resulting first polymeric product is free of any polymerized acrylic monomers. The modifier reactant feed to the second reaction zone is GMA, HEA, HEMA, HPMA, unsaturated fatty alcohols, allylic hydroxyl compounds, or combinations thereof. GMA or HEA are used in one embodiment. The modifier is about 5% to about 50% by weight of the feed into the second reactor zone, preferably about 15% to about 35% by weight.

In another embodiment, the monomer feed to the first reaction zone comprises from about 30% to about 70% of maleic anhydride (MAH), preferably about 40% to about 60%, by weight, the balance of the monomer feed being a $C_8$ to $C_{28}$ α-olefin, and optionally solvent and initiator. The modifier reactant feed to the second reaction zone is GMA, HEA, HEMA, HPMA, or combinations of these monomers. GMA or HEA are used in one embodiment. The modifier reactant amount is about 5% to about 50%, preferably about 15% to about 35% by weight of the feed into the second reactor zone.

In another embodiment, the monomer feed to the first reaction zone comprises from about 15% to about 60% of glycidyl methacrylate, preferably about 30% to about 50%, by weight and the balance of the monomer feed being a $C_8$ to $C_{28}$ α-olefin, and optionally solvent and initiator. The modifier reactant fed to the second reaction zone is preferably acrylic acid (AA), methacrylic acid (MAA), or combinations of these monomers. The amount of modifier reactant is about 5% to about 50%, preferably about 15% to about 35% by weight of the feed into the second reaction zone.

In another embodiment, the monomer feed to the first reaction zone is comprised of all acrylates and methacrylates so that the first polymeric product leaving the first reaction zone is a saturated acrylic polymer formed by a free radical polymerization reaction. The reactive modifier feed to the second reaction zone is also comprised of all acrylates and methacrylates, so that the reactive polymer leaving the second reaction zone is completely made up of acrylates and methacrylates.

In another embodiment, the monomer feed to the first reaction zone is comprised of from about 10% to about 80% styrenics.

Optionally, one or more suitable initiators may also be added to the first reaction zone. Suitable initiators are, for example, aliphatic azo compounds such as 1-t-amylazo-1-cyanocyclohexane, azo-bis-isobutyronitrile and 1-t-butylazo-cyanocyclohexane, 2,2'-azo-bis-(2-methyl)butyronitrile and peroxides and hydroperoxides, such as t-butylperoctoate, t-butyl perbenzoate, dicumyl peroxide, di-t-butyl peroxide, t-butyl hydroperoxide, cumene hydroperoxide, and the like. Additionally, di-peroxide initiators may be used alone or in combination with other initiators. Such di-peroxide initiators include, but are not limited to, 1,4-bis-(t-butyl peroxycarbo)cyclohexane, 1,2-di(t-butyl peroxy)cyclohexane, and 2,5-di(t-butyl peroxy)hex-3-yne, and other similar initiators well known in the art. The preferred initiator is di-t-butyl peroxide.

The initiator is preferably added simultaneously with the monomers. The initiators may be added in any appropriate amount, but preferably the total initiators are added in an amount of about 0.005 to about 0.06 moles initiator(s) per mole of monomers in the feed. For this purpose initiator is either admixed with the monomer feed or added to the process as a separate feed.

The process of the present invention optionally may additionally include one or more solvents in the reactor feed of the first reaction zone. The solvent may be fed into the reactor together with the monomers, or in a separate feed. The solvent may be any solvent well known in the art that does not react with the functional group on the functional monomer(s) at the high temperatures of the continuous process described herein. Such solvents include, but are not limited to, xylene, toluene, ethyl-benzene, Aromatic-100∂, Aromatic 150∂, Aromatic 200∂ (all Aromatics available from Exxon), acetone, methyl ethyl ketone (MEK), methyl amyl ketone (MAK), methyl isobutyl ketone, N-methylpyrrolidinone, and combinations thereof. When used, the solvents are present in any amount desired, taking into account reactor conditions and monomer feed. In a preferred embodiment, one or more solvents are present in an amount of 0–40% by weight based on the total weight of the monomers in the feed to the first reaction zone, more preferably 0–25%.

The first reaction zone is maintained at a temperature of about 120° C. to about 310° C., preferably about 175° C. to about 270° C. The average residence time for the reactants within the first reaction zone is generally less than 60 minutes, preferably about 30 minutes or less, and still more preferably about 15 minutes or less. The monomers undergo polymerization within the first reaction zone to produce the first polymeric product.

The reaction mixture containing the first polymeric product is then preferably passed through a devolatizer to remove solvent, excess monomers, and other volatile components from the first polymeric product. The devolatizer equipment may be an integral part of the second reaction zone. Any suitable devolatization technique and equipment well known in the art may be used. In one embodiment, wipe film evaporation (WFE) is used. In a preferred embodiment, the first polymeric product is continuously charged into a second reaction zone.

The first polymeric product is then directly charged into a second reaction zone. This second reaction zone is preferably free of solvent. One or more modifier reactants are then added to the second reaction zone. The modifier reactant(s) contains one or more functional groups that can react with the functional groups on the first polymeric product. These modifier reactants may be selected from the group of functional monomers previously discussed. Additional modifiers may include drying oils, fatty acids, fatty esters, fatty alcohols, allylic, other alkene containing compounds added in order to build unsaturation into the reactive polymer, and combinations thereof. The compounds can have one or more double bonds, which can be conjugated or non-conjugated. Examples include, but are not limited to, ricinoleic acid, castor oil, oleic acid, linoleic acid, ethyl linoleate, linolenic acid, linseed oil, soybean oil, tung oil, allyl glycidyl ether, and allyl alcohol.

One or more suitable catalysts may be added to the second reaction zone for accelerating the reaction between the functional groups of the first polymeric product and the modifier reactant. Suitable catalysts include, but are not limited to, phosphines, such as triphenylphosphine, amines, such as dimethylbenzylamine, dimethylethanolamine and tributylamine, tetraalkylammonium halides, p-toluenesulfonic acid, and organotin compounds. The molar ratio of functional groups of the first polymeric product to the functional groups of the modifier reactants is preferably from 1:2 to 5:1, and more preferably from 0.7:1 to 2.2:1 and still more preferably from 0.7:1 to 1.5:1. The reactive polymer is thereby formed in the second reaction zone.

In order to avoid premature thermal cross-linking of the reactive polymer, it may be advisable to add from 0.005 to 0.5 parts by weight, or in another embodiment from 0.1 to 0.16 parts by weight, and in still another embodiment from 0.3 to 0.8 parts by weight, of a free radical inhibitor to the second reaction zone. Examples of suitable free radical inhibitors are phenylthiazines, sterically hindered o-phenols, hydroquinone, or hydroquinone derivatives. In one embodiment, methoxyhydroquinone and/or hydroquinone are utilized.

The reactive side chains of the reactive polymer may start to cross-link, yet because the process is continuous, the level of crosslinking can be controlled by the residence time, temperature, and inhibitor concentration, so that the reactive polymer leaving the process is gel free. Because this invention allows for this control over the product, novel, semi-crosslinked reactive polymers can be produced. These products would not require as much cross-linking time or catalyst to finish the cure, since they have already progressed along the cure curve. The process allows for high molecular weight greater than 6000. Furthermore, these novel reactive polymers can have a functionality weight greater than 2000 grams per mole of reactive group.

The second reaction zone is maintained at a temperature of about 120° C. to about 310° C., preferably about 120° C. to about 270° C. The average residence time for the reactants within the second reaction zone is generally less than 90 minutes, in one embodiment 60 minutes, in another embodiment less than 30 minutes, and in still another embodiment from 3–20 minutes. The first polymeric product and the modifier reactant(s) undergo condensation and/or addition reactions within the second reaction zone to produce the reactive polymer. The amount of modifier reactant converted into the reactive polymer generally ranges from 80% to 100%, and in one embodiment greater than 80%. The modifier reactant that is not incorporated into the reactive polymer may be removed by any means well known in the art, if desired, or may remain within the reactive polymer.

The first stage of the process of the present invention may be conducted using any type of reactor well-known in the art, in a continuous configuration. Such reactors include, but are not limited to, continuous stirred tank reactors ("CSTRs"), tube reactors, loop reactors, extruder reactors, plug flow reactors, reactor trains or any reactor suitable for continuous operation. One or more of the reactors used may optionally be vented. Examples of such methodologies include U.S. Pat. No. 4,414,370, issued to Hamielec et al.; U.S. Pat. No. 4,529,787, issued to Schmidt et al; and U.S. Pat. No. 4,456,160, issued to Brand et al, the disclosures of all of which are hereby incorporated by reference.

In one preferred embodiment, the first reaction zone of the continuous polymerization process generally comprises a well mixed CSTR of any type adapted for variable fillage operation of from as low as 10% to as much as 100% of the usable volume thereof for the production of the first polymeric product. The CSTR generally used in the process may be either horizontal or vertical and should have provision for close control of the temperature therein by any desired means, including control by a cooling jacket, internal cooling coils or by withdrawal of vaporized monomers followed by condensation thereof and return of the condensed reactants to the first reaction zone.

A preferred form of CSTR which has been found suitable for use in the first reaction zone of the process is a tank reactor provided with cooling coils and/or cooling jackets sufficient to remove any heat of polymerization not taken up by raising the temperature of the continuously charged functional monomer composition so as to maintain a preselected temperature for polymerization or therein. Preferably such a CSTR will be provided with at least one, and usually more, agitators to provide a well-mixed reaction zone.

In operating the present continuous polymerization process, flexibility and range of choice may be realized in the types of polymer produced and the production rate of the polymer by proper choice of polymerization reaction conditions. In operation, at least one functional monomer is continuously charged to the reactor optionally together with at least one suitable polymerization initiator, solvent and/or non-functional monomer and maintained at the desired temperature. The reactor is generally charged from a stirred feed tank which contains the mixed reactants. However, the functional monomers and any optional components such as initiators, solvents or non-functional monomers may also be individually charged into the reactor.

After initially filling the reactor to the desired level and initiating the polymerization of the charged reactants, the volume of reactant composition charged into the reactor is adjusted to maintain a desired level of reactant and first polymeric product mixture in the reactor. Thereafter, the liquid mixture of the first polymeric product and unreacted monomer or monomers, solvent and/or initiator is withdrawn from the reactor at a rate to maintain a constant level in the reaction zone. Polymerization conditions are maintained in the reactor to produce a first polymeric product of selected molecular weight and conversion of monomers in such liquid mixture.

As noted, the level to which the reactor is filled can vary from as low as 10% to as high as 100% of the usable volume and may be controlled by any desired means, for example, a level controller associated with a valve or pump in the transfer line from the reactor.

Any desired means for controlling the temperature within the reactor may be employed. It is preferred that the temperature be controlled by circulation of a cooling fluid, such as oil, through internal cooling coils and/or reactor circulation jackets in reactors so equipped. Generally, the entry of relatively cool reactants serves to remove the greatest proportion of the heat of polymerization released, and the internal cooling coils serve to remove the remainder so as to maintain the temperature of the reaction mixture at a preselected value.

Figure 2:
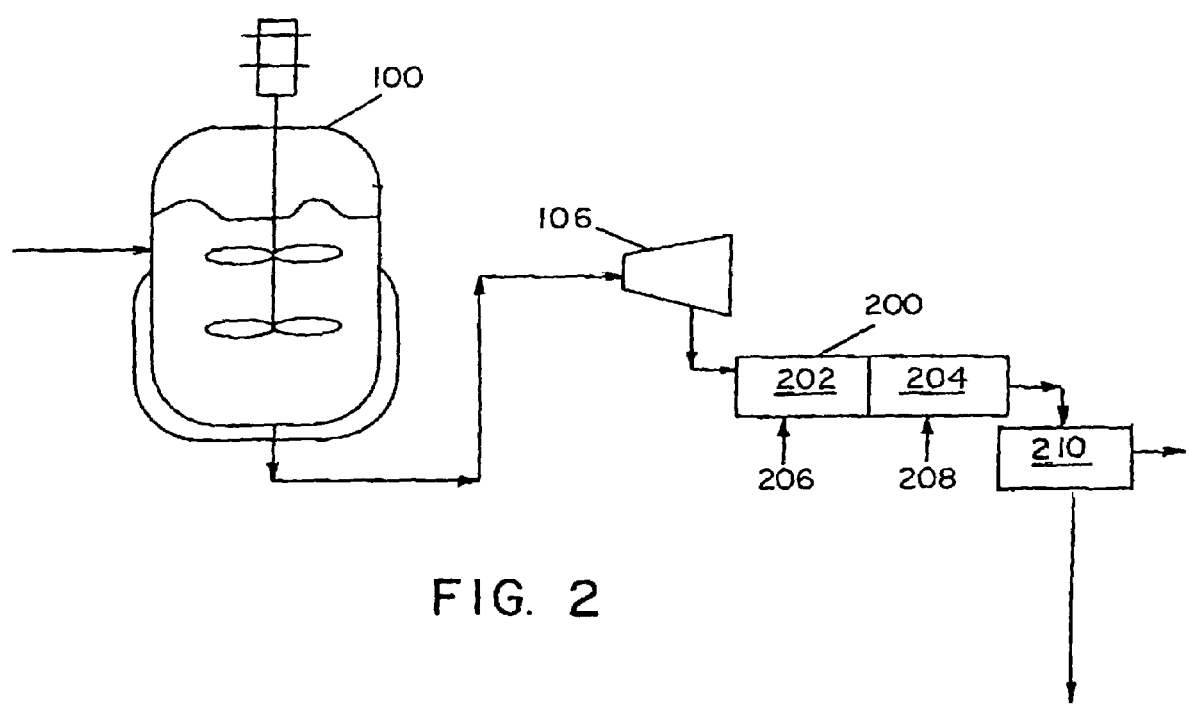
FIG. 2 is a schematic diagram of a polymerization reactor network utilized in the present invention having a devolatizer placed between the primary and secondary reactors.

The first and second reaction zones are shown in FIGS. 1 and 2. First and second reaction zones 100 and 200 are optionally vented. Exemplary reactors include any reactors known in the art as previously described that are suitable for continuous operation, including combinations of reactors in series or parallel. FIGS. 1 and 2 illustrate an exemplary first reaction zone 100 that is a CSTR and a second reaction zone 200 that is a tube reactor. The secondary tube reaction zone 200 has one or more zones such as zones 202 and 204 and may be equipped with static mixers. Multiple zones such as 202 and 204 may have individual temperature control. The tube reaction zone 200 has one or more feed zones 206 and 208 for the addition of the modifier reactant. Inhibitors, catalysts, solvents, and other species may also be added through the feed zones.

FIG. 1 illustrates a reactor where the product from the first reaction zone 100 is directly charged to the second reaction zone 200 without removal of any residuals from the product of reaction zone 100. FIG. 2 illustrates a reaction zone where the product from the first reactor is directly charged to the second reaction zone 200 with some or all of the residuals removed via a devolatizer 106. In both cases it is important that the free radical initiator is essentially used Up in reaction zone 100, so that premature reaction on the reactive modifier does not take place. This is an advantage to the process invented. At the temperatures used, essentially all the initiator is consumed in reaction zone 100 and in the transfer piping to reaction zone 200, thereby allowing the vinyl functionalization of polymers in reaction zone 200.

The unreacted monomers, reaction byproducts, inert solvent, and modifier reactants may be removed from the product. FIGS. 1 and 2 illustrate a separator 210 at the end of reaction zone 200; Removal can take place at the end of reaction zone 200 by any means known in the art Such as, but not limited to, wipe film evaporators and flash tanks. Removal can also take place at reaction zone 200 via venting at reactor vent 201, as shown in FIG. 1. For example, the reaction zone 200 could be a CSTR outfitted with a with some separation unit 201, such as, but not limited to, a vent, packed column, or distillation column.

The resulting reactive polymers of the present invention can be further reacted by self-cross-linking or further reaction upon exposure to suitable agents such as UV radiation, heat, etc. Alternatively, the reactive polymers may be cured by cross-linking agents such as isocyanate, melamine for hydroxyl functional oligomers, or additional initiators such as hydrogen peroxide for unsaturated oligomers on the reactive polymers.

The reactive polymers of the present invention have a number of applications. These applications include, but are not limited to, binders for use for UV/EB cure markets, hot-melt/pressure sensitive adhesives, in-mold coatings, and low cure temperature powder coatings. Reactive polymers of the present invention which are polyols with high acid number may be used for automotive coatings, industrial maintenance, and powder coatings. Polyol reactive polymers with lower VOC (due to lower viscosity) demonstrate improved pigment wetting and flexibility and optimal between pot-life and dry time. The reactive polymers of the present invention are also useful as solvent-borne and water-borne autooxidative-cure coatings.

When the reactive polymers are utilized as binders for powder coating, the reactive polymers are preferably dried in a conventional manner to give powders having a mean particle diameter of from 10 to 100 µm. Other additives, such as pigments, cross-linking catalysts, stabilizers, dulling agents and leveling agents may be added to the reactive polymers during processing into a powder.

The powders obtained from the reactive polymers have a relatively low film formation temperature, which however is substantially above the maximum storage temperature. If the copolymers are formulated to have a higher or lower film formation temperature, the maximum storage temperature is also higher or lower. In practice, film formation and UV radiation are carried out by conventional methods known to those of ordinary skill in the art, at from about 70° C. to about 150° C., depending on the field of use.

Novel first polymeric products created via free radical mechanisms having side chain compounds with internal double bonds have been surprisingly and unexpectedly discovered. These are unique compounds which can be crosslinked via methods well known to those skilled in the art. By using monoglycerides, reactive polymers with hydroxyl functional side chains can be made. If the glyceride is unsaturated, the reactive polymer side chains can have dual functionality. Diglycerides can also lead to hydroxyl functional side chains via transesterification.

It has been surprisingly and unexpectedly discovered that unique reactive polymers can be created. One unique reactive polymer consists essentially of a first polymeric product created by free-radical polymerization of unsaturated anhydride(s), α-olefin(s) and optionally styrene(s), with unsaturated side chains attached to the polymeric product, wherein the average functionality is greater than two double bonds per chain. The weight percent of the side chains is from about 5% to about 50% of the reactive polymer.

A further novel reactive polymer consists essentially of a first polymeric product created by free-radical polymerization of unsaturated anhydride(s), α-olefin(s) and acrylate(s), and unsaturated side chains attached to the first polymeric product. The acrylate(s) comprise greater than 50% by weight of the first polymeric product. The average functionality of the reactive polymer is greater than two double bonds per side chain.

The polymers described in the prior two paragraphs are unique. They have excellent adhesion to many substrates and wet out many surfaces well. They also display good surface activity and affinity to both polar and non-polar substances. Once cross-linked, they form films with good resistance properties. Some of these unique features may be attributable to the fact that maleic anydride can not polymerize by itself. Therefore the anydride groups will be evenly space on the first polymeric product's backbone. Subsequently the reactive groups too will be more evenly spaced, allowing for more balanced cross-linking. The maleic anhydride/α-olefins monomer mixtures also produce polymers with stiff backbones but with flexible side chains and low Tgs. These may provide for better anchoring on substrates. The maleic anhydride and α-olefin monomer mixtures produce polymers with no ester content in them when fully neutralized, making these water dispersible polymers more compatible than water dispersible polyacrylics with non-polar surfaces and compounds. Incorporation of styrene and acrylates allows for excellent control of the Tg and compatibility with other more polar surfaces.

Other unique reactive polymers capable of undergoing free radical crosslinking consist essentially of a first polymeric product created by free radical polymerization, the first polymeric product having attached unsaturated side chains. The first polymeric product comprises at least about 55% by weight of one or more styrenics. The remainder of the backbone is comprised of functional monomers and optionally non-functional monomers as described earlier. The average functionality of the reactive polymer is greater than two double bonds per chain. The weight percent of the side chains is from about 5% to about–50% of the total weight of the reactive polymer. It has been surprisingly and unexpectedly discovered that reactive polymers which contain at least about 55% styrenics in the first polymeric product, or in another embodiment at least about 80% styrenics in the first polymeric product, have a higher refractive index and produce coatings having a higher gloss than those polymers containing a lower percentage of styrenics. These reactive oligomers are very hard polymers with a relatively high Tg. They have low ester and oxygen content in the polymer backbone, making them more compatible with non-polar substrates and surfaces.

In one embodiment, the styrenics used are styrene monomers, α-methylstyrene monomers or combinations thereof. The remainder of the reactive polymer can be other ethylenically reactive monomers, of which about 5% to about 45% by weight, preferably about 15% to about 35% by weight, are monomers with a functional group. Preferred monomers are AA, GMA, GA, MAA, HEA, HEMA and MAH. The modifier reactant feed to the second reaction zone is GMA, HEA, HEMA, HPMA, AA, MAA, unsaturated fatty alcohols, allylic hydroxyl compounds maleic anhydride and unsaturated fatty acids.

A further novel reactive polymer consists essentially of a first polymeric product and side chains attached to the first polymeric product, the side chains containing unsaturated groups wherein the amount of unsaturation in the unsaturated reactive polymer is greater than 2000 grams per mole unsaturated group. In other embodiments, the side chains contain unsaturated groups having an amount of unsaturation in the unsaturated reactive polymer greater than 6000 grams per mole unsaturated group, or greater than 10,000 grams per mole unsaturated group. The first polymeric product is produced by polymerization of monomers selected from the group consisting of acrylates, styrenics, α-olefins, anhydrides and combinations thereof. The side chains are selected from the group consisting of acrylic, methacrylic, and allylic functional groups. These novel polymers can be readily processed in end use applications and advantageously require less cure time and/or catalyst than conventional polymers.

It has been discovered too that these novel semi-crosslinked compounds have lower solution and bulk viscosities than linear polymers with the same Mw. Therefore these polymers alleviate to some degree the high viscosities of the final reactive formula that are obtained when trying to incorporate higher molecular weight reactive oligomers. The combination of higher molecular weight and lower relative viscosity allows for more formulation control. Specifically, less initiators, less reactive diluents, and/or less cure time are benefits to using these novel compounds. The unique processing described earlier allows for the controlled production of these unique compounds.

Other novel reactive polymers consist essentially of a first polymeric product with attached side chains comprising internal double bonds. The first polymeric product has functional groups selected from the group consisting of carboxylic acids and anhydrides. The weight percent of the acids and anhydrides is between about 15% to about 70% by weight of the first polymeric product, preferably about 30% to about 60%. The remainder of the first polymeric product is comprised of other functional monomers and non-functional monomers as described earlier. The side chains are added to the first polymeric product by the reaction of the functional groups on the first polymeric product with primary or secondary hydroxyl groups on a modifier reactant. The modifier reactant is selected from the group consisting of monoglycerides and diglycerides. The amount of the monoglycerides and diglycerides is between about 15% to about 70% by weight preferably about 25% to about 60% by weight o the reactive polymer.

Still other novel reactive polymers include a reactive polymer consisting essentially of a first polymeric product with side chains attached. The first polymeric product has functional groups selected from the group consisting of ester and hydroxyl. The weight % of the ester and hydroxyls is between about 15 to 70 wt. % of the first polymeric product, preferably 30 to about 60%. The remainder of the first polymeric product is comprised of other functional monomers and non-functional monomers as described earlier. The side chains are added by a transesterification reaction between the functional groups on the first polymeric product and glycerides. The amount of the glycerides is between about 15% to about 70%, preferably about 25% to about 60%, by weight of the reactive polymer.

The polymers described in the prior two paragraphs can be used in air cure applications with metal driers known in the art. They produce glossy coatings that display good chemical resistance and good adhesion to porous and non-porous substrates. One advantage of the novel resins described above is that they use simpler modifier compounds than reported in the prior art, such as raw linseed oil, castor oil, soybean oil, other triglycerides, and mono- and di-glycerides. Minimal processing of the modifier is needed, which helps preserve the unsaturation and minimizes cost and pollutants. Another advantage is that the resulting polymers can be made with residual carboxyl functionality for dispersion in water systems. Prior art involving free radical produced backbones using fatty acid derivatives required the use of glycidyl functional fatty acid derivatives, amine functional fatty acid derivatives, or the mono-fatty acids derived from triglycerides. There is also prior art for producing the monoglycerides with an alcoholysis reaction between glycerol and the triglyceride oils and then using the resultant diols in a polycondensation reaction. In these reactions the monoglyceride is part of the main chain. In order to make these systems water soluble, excess acid is used, which can limit the molecular weight. Furthermore, the backbones are limited to using condensation monomers such as diacids, diamines, and glycols.

The invention will be further described by reference to the following examples that are presented for the purpose of illustration only and are not intended to limit the scope of the invention. Unless otherwise indicated, all parts are by weight.

EXAMPLES

In the following tables, Mn, Mw and Mz refer to the number, weight and z-average molecular weight. The following abbreviations are used throughout the Examples:

| | |
|---|---|
| AA | Acrylic Acid |
| AMS | α-Methylstyrene |
| BA | Butyl acrylate |
| CSTR | Continuous stirred tank reactor |
| DTBP | Di-tertiarybutyl peroxide |
| EEA | 2-ethoxyethyl acrylate |
| EHA | 2-Ethylhexyl acrylate |
| GC | Gas chromatography |
| HEA | 2-Hydroxyethyl acrylate |
| HEMA | 2-Hydroxyethyl methacrylate |
| HPMA | Hydroxypropyl methacrylate |
| HQ | Hydroquinone |
| IPOH | Isopropyl alcohol |
| MAA | Methacrylic acid |
| MAH | Maleic anhydride |
| MAK | Methyl amyl ketone |
| MHQ | Methoxyhydroquinone |
| MMA | Methyl methacrylate |
| NMP | N-methyl pyrrolidinone |
| PTSA | p-Toluenesulfonic acid |
| SAH | Succinic anhydride |
| St | Styrene |

Example 1

Production of a Dual Functional Carboxylic Acid/Unsaturated Reactive Acrylic Polymer Examples 1–10 show post-modification of the first polymeric product with the modifier reactant through addition reactions to produce the reactive polymers of the present invention.

In Example 1, the first polymeric product produced in the first reaction zone is a carboxylic acid functional polymer, which is directly charged into the second reaction zone with glycidyl methacrylate to obtain a dual functional carboxylic acid/unsaturated reactive acrylic polymer.

A reaction mixture including 21% St, 9.9% AA, 46.61% MMA, 19.31% BA, 2.85% IPOH, and 0.33% DTBP was continuously supplied to a first reactor comprising an agitated reaction zone maintained at a constant temperature. Reaction zone mass and feed mass flow rate were controlled to provide a constant average residence time within the 10 to 15 minute range in the agitated reaction zone. The reaction temperature of the agitated reaction zone was maintained constant at different settings within the range of 175–232° C. The first polymeric product was continuously pumped to a devolatization zone, and then a reactor train. The continuous in-line post-modification in the reactor train was performed by addition of 15.21 parts glycidyl methacrylate, 0.07 parts tetraethylammonium iodide, and 0.07 parts MHQ to 100 parts first polymeric product at 180° C. for an average residence time of 5 minutes. Based on acid titration, about 75% conversion for the in-line post-modification process was achieved. The average number of double bonds per polymer chain (#DB/chain) was determined by $^1$H NMR spectroscopy, and is shown below with other properties of the acrylic polymer in Table 1.

These types of reactive acrylic polymers are for UV/EB/peroxide cure markets, hot-melt/pressure sensitive adhesives, in-mold coatings, and low cure temperature powder coatings.

TABLE 1

| Polymer | Mw | Tg (° C.) | AN | #DB/Chain |
|---|---|---|---|---|
| After 1st Zone | 14,500 | 62 | 75 | 0 |
| After 2nd Zone | 44,700 | 32 | 20 | 3.83 |

Example 2

Production of a Hydroxy Functional Reactive Acrylic Polymer with Long Bulky Hydrocarbon Chain In this example, the first polymeric product produced in the first reaction zone is a carboxylic acid functional polymer, which is directly charged into the second reaction zone with Cardura E-10∂ (glycidyl ester of Versaticlo, which is a highly branched carboxylic acid, containing 10 carbon atoms) (Shell Chemical) to obtain a hydroxy functional reactive acrylic polymer with bulky hydrocarbon chains.

A reaction mixture including 21% St, 9.9% AA, 46.61% MMA, 19.31% BA, 2.85% IPOH, and 0.33% DTBP was continuously supplied to a reactor comprising an agitated reaction zone maintained at a constant temperature. Reaction zone mass and feed mass flow rate were controlled to provide a constant average residence time within the 10 to 15 minute range in the agitated reaction zone. The reaction temperature of the agitated reaction zone was maintained constant at different settings within the range of 175–232° C. The first polymeric product was continuously pumped to a devolatization zone, and then a reactor train. The continuous in-line post-modification in the reactor train was performed by addition of 26.78 parts Cardura E-10∂, 0.07 parts tetraethylammonium iodide, and 0.09 parts MHQ to 100 parts first polymeric product at 180° C. for an average residence time of 5–10 minutes. Conversion of 75% for the in-line post-modification process was calculated from acid titration. Properties of the first polymeric product and the reactive acrylic polymer are given below in Table 2.

This type of hydroxy functional oligomer provides polyol products with low viscosity resulting in low VOC, improved pigment wetting and flexibility, and optimal between pot-life and dry time.

TABLE 2

| Polymer | Mw | Tg (° C.) | AN | Hydroxy number |
|---|---|---|---|---|
| After 1st Zone | 14,500 | 62 | 75 | 0 |
| After 2nd zone | 20,000 | 31 | 22 | 50 |

Example 3

Production of a Dual Function Carboxylic Acid/Hydroxy Functional Reactive Acrylic Polymer with Long Bulky Hydrocarbon Chain In this example, the first polymeric product produced in the first reaction zone is a carboxylic acid functional polymer, which is directly charged into the second reaction zone with Cardura E-10™ to obtain a dual functional carboxylic acid/hydroxy reactive acrylic polymer with bulky hydrocarbon chains.

A reaction mixture including 18.62% St, 37.58% AMS, 33.02% AA, 7.64% EHA, and 3.14% DTBP was continuously supplied to a reactor comprising an agitated reaction zone maintained at a constant temperature. Reaction zone mass and feed mass flow rate were controlled to provide a constant average residence time within the 10 to 15 minute range in the agitated reaction zone. The reaction temperature of the agitated reaction zone was maintained constant at different settings within the range of 175° C.–232° C. The first polymeric product was continuously pumped to a devolatization zone, and then a reactor train. The continuous in-line post-modification in the reactor train was performed by addition of 49.85 parts Cardura E-10™, 0.12 parts tetraethylammonium iodide, and 0.16 parts MHQ to 100 parts first polymeric product at 160° C. for an average residence time of 5–10 minutes. Based oil acid titration, the yield for the in-line post-modification process was 75%. Properties of the first polymeric product and the reactive acrylic polymer are given below in Table 3.

This type of hydroxy functional polymer provides polyol products with improved pigment dispersion, low viscosity resulting in low VOC, improved pigment wetting and flexibility, and optimal between pot-life and dry time.

TABLE 3

| Polymer | Mw | Tg (° C.) | AN | Hydroxy number |
|---|---|---|---|---|
| After 1st Zone | 1,800 | 82 | 253 | 0 |
| After 2nd zone | 3,000 | 27 | 95 | 148 |

Example 4

Production of an Unsaturated Reactive Acrylic Polymer

In this example, the first polymeric product produced in the first reaction zone is an epoxy functional polymer, which is directly charged into the second reaction zone with MAA to obtain an unsaturated reactive acrylic polymer.

A reaction mixture including 27% St, 13.5% glycidyl methacrylate, 40.5% MMA, 9.0% BA, 9.5% xylene, and 0.5% DTBP was continuously supplied to a reactor comprising an agitated reaction zone maintained at a constant temperature. Reaction zone mass and feed mass flow rate were controlled to provide a constant average residence time within the 10 to 15 minute range in the agitated reaction zone. The reaction temperature of the agitated reaction zone was maintained constant at different settings within the range of 175° C.–232° C. The first polymeric product was continuously pumped to a devolatization zone, and then a reactor train. The continuous in-line post-modification in the reactor train was performed by addition of 9.10 parts MAA, 0.10 parts tetraethylammonium iodide, and 0.10 parts MHQ to 100 parts first polymeric product at 120° C. for an average residence time of 8 minutes. Conversion for the in-line post-modification was determined to be 85% by GC based on the MAA residue in the oligomer. The average number of double bonds per polymer chain (#DB/chain) was determined by $^1$H NMR spectroscopy. Properties of the first polymeric product and the reactive acrylic polymer are given below in Table 4.

This type of reactive acrylic polymer are used in various applications such as UV/EB/peroxide cure markets, hot-melt/pressure sensitive adhesives, in-mold coatings, and low cure temperature powder coatings.

TABLE 4

| Polymer | Mw | Tg (° C.) | % MAA residue | #DB/chain |
|---|---|---|---|---|
| After 1st Zone | 6,187 | 58 | 0 | 0 |
| After 2nd zone | 6,921 | 54 | 1.25 | 2.21 |

Example 5

Production of an Autooxidative-Cure Unsaturated Reactive Acrylic Polymer

In this example, the first polymeric product produced in the first reaction zone is an epoxy functional polymer, which is directly charged into the second reaction zone with Palmolyn 200∂ (linoleic acid, Hercules) to obtain an autooxidative-cure unsaturated reactive acrylic polymer.

A reaction mixture including 27% St, 13.5% glycidyl methacrylate, 40.5% MMA, 9.0% BA, 9.5% xylene, and 0.5% DTBP was continuously supplied to a reactor comprising an agitated reaction zone maintained at a constant temperature. Reaction zone mass and feed mass flow rate were controlled to provide a constant average residence time within the 10 to 15 minute range in the agitated reaction zone. The reaction temperature of the agitated reaction zone was maintained constant at different settings within the range of 175° C.–232° C. The first polymeric product was continuously pumped to a devolatization zone, and then a reactor train. The continuous in-line post-modification in the reactor train was performed by addition of 38.03 parts Palmolyn 200, 0.06 parts tetraethylammonium iodide, and 0.08 parts MHQ to 100 parts first polymeric product at 160° C. for an average residence time of 30 minutes. Acid titration was utilized to determine percent conversion for the in-line post-modification process and the level of air-dry fatty acid per oligomer chain (#fatty acid unit/chain). Properties of the first polymeric product and the reactive acrylic polymer are given below in Table 5.

This type of reactive acrylic polymer is particularly useful in waterborne and solvent-borne autooxidative cure applications.

TABLE 5

| Polymer | Mw | Tg (° C.) | % Palmolyn 200 Residue | # Fatty Acid Unit/Chain |
|---|---|---|---|---|
| After 1st Zone | 6,187 | 58 | 0 | 0 |
| After 2nd zone | 9,266 | 10.5 | 1.25 | 2.20 |

Example 6

Production of a Dual Functional Carboxylic Acid/Hydroxy Reactive Acrylic Polymer In this example, the first polymeric product produced in the first reaction zone is a hydroxy functional polymer, which is directly charged into the second reaction zone with succinic anhydride to obtain a dual functional carboxylic acid/hydroxy reactive acrylic polymer.

A reaction mixture including 31.15% St, 31.15% HEMA, 26.7% EHA, 10% MAK, and 1% DTBP was continuously supplied to a reactor comprising an agitated reaction zone maintained at a constant temperature. Reaction zone mass and feed mass flow rate were controlled to provide a constant average residence time within the 10 to 15 minute range in the agitated reaction zone. The reaction temperature of the agitated reaction zone was maintained constant at different settings within the range of 175° C.–232° C. The first polymeric product was continuously pumped to a devolatization zone, and then a reactor train. The continuous in-line post-modification in the reactor train was performed by addition of calculated amount of SAH to first polymeric product at 120° C. for an average residence time of 20 minutes. Properties of the first polymeric product and the reactive acrylic polymer are given below in Table 6.

The resulting reactive polymers with controlled level of dual carboxylic acid and hydroxy functionalities were obtained in quantitative yield. These reactive acrylic polyol polymers with high acid number are useful in preparing automotive coatings, industrial maintenance, and powder coatings.

TABLE 6

| Polymer | AN (desired) | Parts of Succinic Anhydride (Per 100 Parts First Polymeric Product) | Mw | AN (obtained) | Hydroxy Number (obtained) |
|---|---|---|---|---|---|
| After 1st Zone | — | — | 2,400 | 0 | 140.00 |
| After 2nd Zone | 20 | 4.30 | 2,649 | 20.84 | 113.34 |
| After 2nd Zone | 25 | 4.48 | 2,591 | 25.94 | 106.24 |
| After 2nd Zone | 30 | 5.37 | 2,613 | 31.01 | 100.17 |

Example 7

Production of a Dual Functional Acid Anhydride/Unsaturated Reactive Acrylic Polymer In this example, the first polymeric product produced in the first reaction zone is an acid anhydride functional polymer, which is directly charged into the second reaction zone with hydroxypropyl methacrylate to obtain a dual functional acid anhydride/unsaturated reactive acrylic polymer.

A copolymer composed of 44% MAH and 56% 1-decene by weight was produced in the first reaction zone at 205° C. in 27% MAK solvent and 0.18% DTBP. The first polymeric product was devolatized to remove unreacted monomers and solvent, and then transferred to the second reaction zone. 100 parts of the first polymeric product was reacted with 29 parts HPMA, 0.03 parts HQ, and 0.57 parts PTSA at approximately 112° C. for 3 minutes to simulate a plug flow reactor. Properties of the first polymeric product and the resulting reactive acrylic polymer are given below in Table 7.

TABLE 7

| Polymer | Mn | Mw | Mz | % HPMA Residue | Estimated Double Bond/Chain (Based on Mw) |
|---|---|---|---|---|---|
| 1st Zone | 1,146 | 3,224 | 7,977 | 0 | 0 |
| 2nd Zone | 836 | 2,871 | 23,510 | 13.084 | 2.5 |

Example 8

Electron Beam (EB) Radiation Cure for the Polymers from Example 7

The polymer from the second reaction zone from Example 7 was cut in acetone at 50% solids. 0.1 grams HQ was added to 100 grams of the acetone cut. This cut was subjected to 15 Mrads EB radiation, giving a polymer with the properties shown in Table 8.

TABLE 8

| Resin Cut | Mn | Mw | Mz |
|---|---|---|---|
| 2nd zone polymer: Before EB cure | 923 | 2960 | 15840 |
| 2nd zone polymer: After EB cure | 1069 | 137000 | $1.1 \times 10^7$ |

The Example 7 polymer from the first reaction zone (without post-modification) contained zero unsaturated functionality. Therefore, it did not respond to the EB irradiation resulting in no change in molecular weight.

The polymer from the first reaction zone is cut in acetone at 50% solids. When this cut is subjected to 15 Mrads EB radiation, no change in molecular weight is detected.

Example 9

Production of a Dual Functional Acid Anhydride/Unsaturated Reactive Acrylic Polymer In this example, the first polymeric product produced in the first reaction zone is an acid anhydride functional polymer, which is directly charged into the second reaction zone with HEA to obtain a dual functional acid anhydride/unsaturated reactive acrylic polymer.

A copolymer composed of 44% MAH and 56% 1-decene by weight was produced at the first reaction zone at 205° C. in 27% MAK solvent and 0.18% DTBP. The first polymeric product was devolatized to remove unreacted monomers and solvent, and then transferred to the second reaction zone. 100 parts of the first polymeric product was reacted with 27.43 parts HEA, 0.03 parts HQ, and 0.57 parts PTSA at approximately 123° C. for 6 minutes to simulate a plug flow reactor. Properties of the first polymeric product and the resulting reactive acrylic polymer are given below in Table 9.

TABLE 9

| Polymer | Mn | Mw | Mz | % HEA Residue | Estimated Double Bond/Chain (Based on Mw) |
|---|---|---|---|---|---|
| 1st zone | 1,146 | 3,224 | 7,977 | 0 | 0 |
| 2nd zone | 839 | 2598 | 9697 | 1.406 | 7.0 |

Example 10

Electron Beam (EB) Radiation Cure for the Polymers from Example 9

The reactive polymer from Example 9 was cut in acetone at 50% solid. 0.1 grams HQ was added to 100 grams of the acetone cut. The cut was then subjected to EB radiation at different doses including 5, 10, and 15 Mrads. The extent of cross-linking for each irradiation was determined by the level of gel obtained using Soxhlet extraction technique, and the results shown in Table 10 were obtained.

TABLE 10

| Dose of EB Radiation (Mrads) | Wt % of Gel |
|---|---|
| 5 | 22 |
| 10 | 47 |
| 15 | 64 |

The above results showed 1) the presence of the unsaturated functionality on the post-modified reactive acrylic polymer of Example 9, and 2) the direct correlation between cross-linking extent and closes of EB radiation.

Example 11

Production of a Dual Functional Carboxylic Acid/Unsaturated Reactive Acrylic Polymer This example and those that follow show post-modification of the first polymeric product with the modifier reactant through condensation reactions to produce the reactive acrylic polymers of the present invention.

In this example, the first polymeric product produced in the first reaction zone is a carboxylic acid functional polymer, which is directly charged into the second reaction zone with hydroxypropyl methacrylate to obtain a dual functional carboxylic acid/unsaturated reactive acrylic polymer.

A first polymeric product composed of 32.3% St, 33.9% AMS, and 33.8% AA by weight was produced in a CSTR at 282° C. with a 12 minutes residence time. The first polymeric product from this first reaction zone was devolatized to remove unreacted monomers and solvent, and then transferred to the second reaction zone. 100 parts of the first polymeric product was reacted with 28.79 parts HPMA, 0.013 parts HQ, and 0.26 parts PTSA at approximately 200° C. for 90 minutes to simulate a continuous vented plug flow reactor. 3.69 parts of water was produced per 100 parts of the first polymeric product from the first reaction zone. The reactive acrylic polymers were taken from the second reaction zone at different time intervals to monitor the reaction. Properties of the first polymeric product and the resulting reactive acrylic polymers are given below in Table 11.

TABLE 11

| Polymer | Residence Time in the 2nd Zone (Min.) | Mn | Mw | Mz | % HPMA Residue | Estimated Double Bond/Chain (Based on Mw) |
|---|---|---|---|---|---|---|
| 11-1 | 0 | 992 | 1,729 | 2,786 | 0 | 0 |
| 11-2 | 30 | 1,061 | 2,187 | 6,400 | 7.196 | 2.2 |
| 11-3 | 60 | 1,150 | 2,869 | 16,070 | 3.605 | >2.7 |
| 11-4 | 90 | 1,150 | 5,034 | 72,100 | 1.450 | >3.0 |

Example 12

Electron Beam (EB) Radiation Cure for the Oligomers from Example 11

The reactive acrylic polymer 11-4 from Example 11 was dispersed in an alkaline aqueous solution at 20% solids. The resin cut was subjected to 15 Mrads EB radiation giving a polymer with the properties in Table 12.

TABLE 12

| Resin Cut | Mn | Mw | Mz |
|---|---|---|---|
| Polymer 11-4: before EB Irradiation | 1148 | 4596 | 60950 |
| Polymer 11-4: after EB Irradiation | 2151 | 498100 | $7.8 \times 10^6$ |

The acrylic polymer 11-1 from Example 11 is dispersed in an alkaline aqueous solution at 20% solids. This resin cut is subjected to 15 Mrads EB radiation. No change in molecular weight is detected.

Example 13

Production of a Dual Functional Carboxylic Acid/Unsaturated Reactive Acrylic Polymer In this example, the first polymeric product produced in the first reaction zone is a carboxylic acid functional polymer, which is directly charged into the second reaction zone with HEMA to obtain a dual functional carboxylic acid/unsaturated reactive acrylic polymer.

A copolymer composed of 32.3% St, 33.9% AMS, and 33.8% AA by weight was produced in a CSTR at 282° C. with a 12 minutes residence time. The first polymeric product from this first reaction zone was devolatized to remove unreacted monomers and solvent, and then transferred to the second reaction zone. 100 parts of the first polymeric product was reacted with 28.87 parts FIEMA, 0.033 parts HQ, and 0.53 parts PTSA at approximately 200° C. for 45 minutes to simulate a continuous vented plug flow reactor. 3.63 parts of water was produced per 100 parts of the first polymeric product from the first reaction zone. The reactive acrylic polymers were taken from the second reaction zone at different time intervals to monitor the reaction. Properties of the first polymeric product and the resulting reactive acrylic polymers are given below in Table 13.

TABLE 13

| Polymer | Residence Time in the 2nd Zone (Min) | Mn | Mw | Mz | % HEMA Residue | Estimated Double Bond/Chain (Based on Mw) |
|---|---|---|---|---|---|---|
| 13-1 | 0 | 992 | 1,729 | 2,786 | 0 | 0 |
| 13-2 | 15 | 1,003 | 5,287 | 85,350 | 5.387 | >2.7 |
| 13-3 | 30 | 1,108 | 8,556 | 125,700 | 2.606 | >3.2 |
| 13-4 | 45 | 1,213 | 14,760 | 223,600 | 1.474 | >3.4 |

Example 14

Production of a Dual Functional Carboxylic Acid/Unsaturated Reactive Acrylic Polymer In this example, the first polymeric product produced in the first reaction zone is a carboxylic acid functional polymer, which is directly charged into the second reaction zone with HEA to obtain a dual functional carboxylic acid/unsaturated reactive acrylic polymer.

A copolymer composed of 32.3% St, 33.9% AMS, and 33.8% AA by weight was produced in a CSTR at 282° C. with a 12 minutes residence time. The first polymeric product from this first reaction zone was devolatized to remove unreacted monomers and solvent, and then transferred to the second reaction zone. 100 parts of the first polymeric product was reacted with 29.64 parts HEA, 0.10 parts HQ, and 1.30 parts PTSA at approximately 173° C. for 45 minutes to simulate a continuous vented plug flow reactor. 2.71 parts of water was produced per 100 parts of the first polymeric product from the first reaction zone. The reactive acrylic polymers were taken from the second reaction zone at different time intervals to monitor the reaction. Properties of the first polymeric product and the resulting reactive acrylic polymers are given below in Table 14.

TABLE 14

| Polymer | Residence Time in the 2nd Zone (Min) | Mn | Mw | Mz | % HEA Residue | Estimated Double Bond/Chain (Based on Mw) |
|---|---|---|---|---|---|---|
| 14-1 | 0 | 992 | 1,729 | 2,786 | 0 | 0 |
| 14-2 | 15 | 1,211 | 3,727 | 11,750 | 1.572 | >4.0 |
| 14-3 | 30 | 1,386 | 6,989 | 28,670 | 1.257 | >4.0 |
| 14-4 | 45 | 1,587 | 18,760 | 113,300 | 0.975 | >4.1 |

Example 15

Electron Beam (EB) Radiation Cure for the Oligomers from Examples 13 and 14

The polymer from Examples 13-4 and 14-4 were independently cut in xylene at 50% solids. 0.06 grams HQ was added per 100 grams of cut. The resin cut of the polymer from Example 13-4 was subjected to 15 Mrads EB radiation, and the resin cut of the polymer from Example 14-4 was subjected to 15 Mrads EB radiation. The extent of crosslinking for each irradiation was determined by the level of gel measured using a Soxhlet extraction technique.

TABLE 15

| Polymer | Wt. % Gel |
|---|---|
| 13-4 (2nd zone product) cut in xylene after EB irradiation | 32 |
| 14-4 (2nd zone product) after EB irradiation | 70 |

The polymers 13-1 and 14-1 were cut in xylene at 50% solids. These cuts were subjected to 15 Mrads EB radiation. The amount of gel in them was determined to be zero.

TABLE 16

| Polymers | Wt % of Gel |
|---|---|
| 13-1 (1st zone product) | 0 |
| 13-4 (2nd zone product) | 32 |
| 14-1 (1st zone product) | 0 |
| 14-2 (2nd zone product) | 70 |

Polymers 13-1 and 14-1 from the first zone (without post-modification) contained zero unsaturated functionality. Therefore, these did not afford crosslinked polymers upon exposure to the EB irradiation resulting in no gel formation. The presence of unsaturation after post-modification on polymers 13-4 and 14-4 was confirmed by crosslinked polymer gel insoluble during the Soxhlet extraction.

Example 16

Production of a Dual Functional Hydroxyl/Unsaturated Reactive Acrylic Polymer

In this example, the first polymeric product produced in the first reaction zone is a hydroxyl functional polymer, which is directly charged into the second reaction zone with AA to obtain a dual functional hydroxyl/unsaturated reactive acrylic polymer.

A feed mix including approximately 90% HEMA, 9.5% NMP, and 0.5% DTBP was continuously fed to a 500 mL CSTR. The reaction mixture was continuously removed from the CSTR. The fresh feed and reaction mix flow rates in and out of the CSTR, respectively, were controlled to maintain a constant average residence time of 12 minutes. The reaction mix temperature inside the CSTR was maintained at 215° C. The reaction mix out of this first reaction zone had the composition shown in Table 16, and was continuously fed to a devolatization zone where solvent, unreacted materials, and by-products were removed from the product.

TABLE 16

| % poly(HEMA) (Mn = 1,287; Mw = 3,140) | % HEMA | % NMP | % Ethylene Glycol |
|---|---|---|---|
| 35.93 | 53.33 | 10.53 | 0.21 |

To mimic a second reaction zone comprised of a continuous tube reaction zone placed downstream the first reaction zone and before the evaporation stage, 100 grams of this reaction mixture was placed in a 500 mL glass reactor and diluted with NMP until 80% of the mixture was NMP. The mixture was maintained at 150° C. As esterification catalyst, 0.3% of PTSA, was added to the reactor and dissolved in the mixture. Then, AA was batch fed into this mixture in a stoichiometry to obtain a number average number of double bonds per polymer chain (NDBn) of 9 at 100% esterification of the AA onto the poly(HEMA) precursor. The consumption of AA and free HEMA with time was followed via CC using samples taken from the reaction mixture at different residence times. The evolution of water, a by-product of the desired esterification reaction, was followed via Carl-Fischer techniques as a means to corroborate the consumption of AA by this reaction correcting for any AA consumed through double bond polymerization.

The AA conversion results, expressed as number average number of double bonds per polymer chain (NDBn) vs reaction residence time (RT), are shown in the Table 17.

TABLE 17

| 2nd Zone Residence Time (Min) | 0 | 10 | 15 | 30 | 45 | 60 |
|---|---|---|---|---|---|---|
| Product NDBn | 0 | 1.2 | 2 | 4.5 | 5.8 | 6.7 |

The resulting unsaturated poly(HEMA) products bear the structure of a random copolymer of HEMA and the acrylic di-ester of HEMA with a labile acrylic double bond per di-ester unit. Thus, they may be considered hydroxyl functional poly-unsaturated acrylic macromers. This type of products finds useful application as functional reactive acrylic polymers for UV/EB/peroxide cure markets, hot-melt/pressure sensitive adhesives, in-mold coatings, and low cure temperature powder coatings.

Example 17

Production of a Dual Functional Carboxyl Ester/Unsaturated Reactive Acrylic Polymer In this example, the first polymeric product produced in the first reaction zone is a carboxyl ester functional polymer, which is directly charged into the second reaction zone with HEMA to obtain a dual functional carboxyl ester/unsaturated reactive acrylic polymer.

A feed mixture including approximately 73% MMA, 25% MAK and 2.0% DTBP was continuously fed to a 2 gallon CSTR. Reaction mixture was continuously removed from the CSTR. The feed and reaction mixture flow rates in and out of the CSTR, respectively, were controlled to maintain a constant average residence time of 15 minutes. The reaction mixture temperature inside the CSTR was maintained at 175° C. The reaction mixture out of this first reaction zone was continuously fed to a devolatization zone where solvent, unreacted materials, and by-products were removed from the product. The resulting poly(MMA) product had the characteristics shown in Table 18.

TABLE 18

| | Mn | Mw | Mz |
|---|---|---|---|
| Poly(MMA) | 5,242 | 49,900 | 117,400 |

To mimic a second reaction zone comprised of a continuous tube reaction zone placed downstream the first reaction zone and after the evaporation stage, 100 grams of the poly(MMA) was placed in a 500 mL glass reactor and diluted with NMP until 80% of the mixture was NMP. The mixture was maintained at 150° C. As trans-esterification catalyst, 0.3% PTSA, was added to the reactor and dissolved in the mixture. Then, HEMA was batch fed into this mixture in a stoichiometry to obtain a number average number of double bonds per polymer chain (NDBn) of 16 at 100% trans-esterification of the HEMA onto the poly(MMA) precursor. The consumption of HEMA with time was followed via GC from samples taken from the reaction mixture at different residence times. The evolution of methanol, by-product of the desired trans-esterification reaction, was also followed via GC as a means to verify the consumption of HEMA by this reaction correcting for any HEMA consumed through double bond polymerization.

The HEMA conversion results, expressed as number average number of double bonds per polymer chain (NDBn) vs reaction RT as well as the product characteristics, are shown in Table 19.

TABLE 19

| 2nd Zone Residence Time (Min) | 0 | 10 | 15 | 30 | 45 | 60 |
|---|---|---|---|---|---|---|
| Product NDBn | 0 | 0.2 | 0.6 | 1.3 | 1.6 | 2.1 |

The resulting unsaturated poly(MMA) products bears the structure of a random copolymer of MMA and the methacrylic cli-ester of MMA with a labile methacrylic double bond per di-ester unit. Thus, these products may be considered ester-functional poly-unsaturated methacrylic macromers. These types of product find application as functional reactive acrylic polymers for UV/EB/peroxide cure markets, hot-melt/pressure sensitive adhesives, in-mold coatings, and low cure temperature powder coatings.

Example 18

Production of a Dual Functional Carboxylic Acid/Unsaturated Reactive Acrylic Polymer In this example, the first polymeric product produced in the first reaction zone is a carboxylic acid functional polymer, which is directly charged into the second reaction zone with HEMA to obtain a dual functional carboxylic acid/unsaturated reactive acrylic polymer.

A feed mixture including approximately 52.3% MMA, 37.7% AA, 9.8% MAK, and 0.2% DTBP was continuously fed to a 2 gallon CSTR. Reaction mixture was continuously removed from the CSTR. The feed and reaction mixture flow rates in and out of the CSTR, respectively, were controlled to maintain a constant average residence time of 15 minutes. The reaction mixture temperature inside the CSTR was maintained at 218° C. The reaction mixture out of this first reaction zone was continuously fed to a devolatization zone where solvent, unreacted material, and by-products were removed from the product. The resulting poly(MMA-co-AA) product had the characteristics shown in Table 20.

TABLE 20

| Copolymer Composition % | Mn | Mw | Mz |
|---|---|---|---|
| MMA/AA = 60.5/39.5 | 2,583 | 8,693 | 17,090 |

To mimic a second reaction zone comprised of a continuous tube reaction zone placed downstream the first reaction zone and after the evaporation stage, 100 grams of the poly(MMA-co-AA) were placed in a 500 mL glass reactor and diluted with NMP until 80% of the mixture was NMP. The mixture was maintained at 120° C. As (trans)esterification catalyst, 0.3% of PTSA, was added to the reactor and dissolved in the mixture. Then, HEMA was batch fed into this mixture in a stoichiometry to obtain a number average number of double bonds per polymer chain (NDBn) of 32 at 100% (trans)esterification of the HEMA onto the poly (MMA-co-AA) precursor. The consumption of HEMA with time was followed via GC from samples taken from the reaction mixture at different residence times. The evolution of both water and methanol, by-products of the desired esterification and trans-esterification reactions respectively, were followed as described earlier as a means to verify the consumption of HEMA by each one of these reactions and to correct for any HEMA consumed through double bond polymerization.

The HEMA conversion results, expressed as number average number of double bonds per polymer chain (NDBn) vs reaction RT as well as the product characteristics, are shown in Table 21.

TABLE 21

| 2$^{nd}$ Zone Residence Time (Min) | 0 | 10 | 15 | 30 | 45 | 60 |
|---|---|---|---|---|---|---|
| Product NDBn | 0 | 2.0 | 5.5 | 14.0 | 20.0 | 23.2 |

Water vs. methanol evolution results show that under these conditions esterification is the main route of HEMA reaction onto the poly(MMA-co-AA), rendering trans-esterification negligible.

Therefore, the resulting unsaturated poly(MMA-co-AA) products bear the structure of a random copolymer of MMA-AA and mainly the methacrylic di-ester of AA with lesser amounts of the methacrylic di-ester of MMA, each of the latter two with a labile methacrylic double bond per di-ester unit. Thus, they may be considered acid-ester-functional poly-unsaturated methacrylic macromers. This type of product finds application as functional radiation-active oligomers for UV/EB/peroxide cure markets, hot-melt/pressure sensitive adhesives, in-mold coatings, and low cure temperature powder coatings.

Example 19

Electron Beam (EB) Radiation Cure for Unmodified Acid Functional Resin

A polymeric product composed of approximately 32% St, 34% AMS, 27% AA, and 7% EEA by weight was produced in a continuous mode. A sample of the resulting resin was subjected to 15 Mrads of EB radiation, giving a polymer with the properties in Table 22.

TABLE 22

| Polymer | Mn | Mw | Mz |
|---|---|---|---|
| Example 19 - before irradiation | 3633 | 9477 | 17180 |
| Example 19 - after EB irradiation | 3663 | 9641 | 18470 |

These results show that with no modification, no crosslinking occurs due to irradiation.

Example 20

Electron Beam (EB) Radiation Cure for Unmodified Acid Functional Resin Aqueous Cut A polymeric product composed of approximately 32% St, 34% AMS, 27% AA, and 7% EEA by weight was produced in a continuous mode. This resin was dissolved in water and ammonium hydroxide to make an aqueous dispersion with 30% solids and pH of approximately 8.8. A sample of the resulting resin dispersion was subjected to 15 Mrads of EB radiation, giving a polymer with the properties in Table 23.

TABLE 23

| Polymer Aqueous Dispersion | Mn | Mw | Mz |
|---|---|---|---|
| Example 20 - before irradiation | 3531 | 9272 | 16830 |
| Example 20 - after EB irradiation | 3888 | 10390 | 19380 |

These results show that with no modification, no significant crosslinking occurs due to irradiation.

Example 21

Electron Beam (EB) Radiation Cure for Unmodified 1-lydroxyl Functional Resin Solvent Cut A polymeric product composed of approximately 36% St, 34% HEMA, and 30% EHA by weight was produced in a continuous mode. This resin was dissolved in MAK to make a 80% solids dispersion. A sample of the resulting resin dispersion was subjected to 15 Mrads of EB radiation, giving a polymer with the properties in Table 24.

TABLE 24

| Polymer Aqueous Dispersion | Mn | Mw | Mz |
|---|---|---|---|
| Example 21 - before irradiation | 1506 | 2664 | 4508 |
| Example 21 - after EB irradiation | 1543 | 2905 | 5255 |

These results show that with no modification, no significant crosslinking occurs due to irradiation.

Example 22

Anhydride Functional Polymer Modified with HEA with No Intermediate Devolatization

A copolymer with a composition by weight of 44% MAH and 56% 1-decene is produced in a reactor at 205° C. with 27% MAK and 0.18 wt. % DTBP. 100 parts of this polymer is pumped to a tube reactor and cooled in the first zone to 123° C. 27 parts HEA, 0.03 parts HQ, and 0.57 parts PTSA is added to the polymer in the second zone. The second zone is held at 123° C. with residence time of 6 minutes. The polymer is devolatized in a wipe-film evaporator and collected.

The product is subjected to 4, 10, and 15 Mrads EB radiation. Gelation is observed in all the samples.

The devolatized product is also blended with acetone to make a 50% cut. 0.1 grams HQ is added to the cut. The polymer is subjected to 15 Mrads EB radiation. Gelation is observed in all the samples.

Example 23

Production of a Maleic Anhydride Reactive Polymer with Less Than 50% Acrylic in the First Polymeric Product and with Reactive Side Chains

A feed of 16% MAH, 24% MMA, and a second feed of 40% St, with 0.18% DTBP and 19.12% MAK are fed to the first reaction zone at 205° C., and a 30 minutes residence time. 100 parts of this first polymeric product is fed to a tube reactor and cooled in the first zone to 150° C. 13 parts HEA, 0.03 parts HQ, and 0.5 parts PTSA are added to the second zone of the tube reactor. The second zone is held at 150° C. for 6 minutes. The reactive polymer is devolatized in a wipe-film evaporator and collected.

Example 24

Production of a Reactive Polymer with Internal Double Bond Side Chains

A feed of 90% HEMA, 9.5% NMP, and 0.5% DTBP are continuously fed to a CSTR at 215° C., with a 15 minutes residence time. 100 parts of the first polymeric product from the CSTR are fed to a vented plug flow reactor. 50 parts ethyl-linoleate and 2 parts PTSA are added to the plug flow reactor. The residence time is maintained at 60 minutes, and the volatiles, including ethanol were removed from the reactor. The resulting polymer is a reactive polymer with internal double bond side chains.

Example 25

Production of a Reactive Polymer with both Hydroxyl Functional and Internal Double Bond Functional Side Chains Derived from Glycerol Mono-Esters

A first polymeric product composed of 32.3% St, 33.9% α-methylstyrene (AMS), and 33.8% AA by weight is produced in a CSTR at 282° C. with a 12 minute residence time. The first polymeric product from this first reaction zone is fed to the second reaction zone. 100 parts of the first polymeric product is reacted with 18 parts glycerol 1-monooleate and 0.26 parts PTSA at 400° C. with a 45 minutes residence time in a vented plug flow reactor. The polymer is removed from the second reaction zone and will have some of the glycerol 1-monooleate attached to it where only one of the hydroxy groups will react with the acid in the first polymeric product. The resulting reactive polymer will have both internal double bonds in the side chain and hydroxy functionality in some of the side chains.

Example 26

Continuous Production of Dual Functional Epoxy/Hydroxyl Unsaturated Reactive Acrylic Polymers

In this example, the first polymeric product continuously produced in the first reaction zone was an epoxy functional polymer, which was continuously admixed with methacrylic acid and the mixture was then continuously charged into the second reactor zone to obtain a dual functional epoxy/hydroxyl unsaturated reactive acrylic polymer.

A fresh feed mix comprised of approximately 41.9% cyclohexyl acrylate (CHA), 20.9% butyl acrylate (BA), 7% glycidyl methacrylate (GMA), 30% methyl-ethyl ketone (MEK) and 0.2% di-tertiary butyl peroxide was continuously fed to a 300 cc CSTR. The reaction mixture was continuously removed from the CSTR. The fresh feed and reaction mix flow rates in and out of the CSTR, respectively, were controlled to maintain a constant average residence time of 12 minutes. The reaction mix temperature inside the CSTR was kept constant at 230° C. The reaction mix out of this first reaction zone was continuously fed to a devolatilization zone where solvent, unreacted material, and by-products were removed from the product. The resulting poly(CHA-co-BA-co-GMA) product was continuously fed to a second reaction zone. At the inlet of the second reaction zone the first reaction zone product was continuously admixed with a fresh feed of methacrylic acid (MAA). The MAA flow was kept constant at a suitable rate equivalent to 0.87 fresh-MMA/GMA-in-first product mole ratio. This reaction mix was continuously fed to a second reaction zone comprised by a 90 mm long, 5 mm ID tubular reactor with static mixers (12 elements), followed by a 200 cm long, 10.7 mm ID jacketed tubular reactor. The temperature in this second reactor zone was controlled at 247° C. The available volume of this second reaction zone provided an average residence time of 15 minutes at the given feed flow rates described.

After an operation time longer than 10 residence times at the above conditions, the MAA flow was increased to a new constant suitable rate equivalent to 1.41 fresh-MMA/GMA-in-first product mole ratio. The rest of all process/product variables were kept as described above.

The characteristics of the first and second zone products thus continuously obtained are summarized in the following table.

TABLE 26

| 1st Zone (CSTR) Conditions | |
|---|---|
| CHA/BA/GMA (monomer ratio in feed w/w) | 60/30/10 |
| MEK/DTBP (% w/w with respect to total mix) | 30/0.2 |
| Reaction Temperature (° C.) | 230 |
| Average Residence Time (minutes) | 12 |
| Devolatilization Zone Temperature (° C.) | 250 |
| 1st Zone Product Characteristics | |
| Mn | 1,600 |
| Mw | 3,100 |

TABLE 26-continued

| | | |
|---|---|---|
| Mw/Mn | | 1.94 |
| Epoxy Value (mol/100 g) | | 0.06774 |

| | A | B |
|---|---|---|
| 2nd Zone (Tube Reactor) Conditions | | |
| MAA feed rate (as MAA/GMA mole ratio) | 0.87 | 1.41 |
| Reaction Temperature (° C.) | 247 | 247 |
| Average Residence Time (minutes) | 15 | 15 |
| 2nd Zone Product Characteristics | | |
| Mn | 1,960 | 2,171 |
| Mw | 4,460 | 3,780 |
| Mw/Mn | 2.28 | 1.73 |
| Epoxy Value (mol/100 g) | 0.0059 | 0.0022 |
| Unreacted MAA content in product (% w/w) | 0.355 | 0.129 |
| Epoxide Conversion (%) | 91.1 | 97.0 |
| Average Double Bonds per Chain (based on Mn) | 1.19 | 1.40 |

This type of in-line modified acrylic polymer is a reactive polymer useful for UV/EB/Peroxide cure markets, hot-melt/pressure sensitive adhesives, in-mold coatings, and low cure temperature powder, high solids, and liquid coatings.

Example 27

Continuous Production of Dual Functional Epoxy/Hydroxyl Unsaturated Reactive Acrylic Polymers In this example, the first polymeric product continuously produced in the first reaction zone was an epoxy functional polymer, which was continuously admixed with methacrylic acid and the mixture was then continuously charged into the second reactor zone to obtain a dual functional epoxy/hydroxyl unsaturated reactive acrylic polymer.

A fresh feed mix comprised of approximately 34.9% cyclohexyl acrylate (CHA), 20.9% butyl acrylate (BA), 14% glycidyl methacrylate (OMA), 30% methyl-ethyl ketone (MEK) and 0.2% di-tertiary butyl peroxide was continuously fed to a 300 cc CSTR. The reaction mixture was continuously removed from the CSTR. The fresh feed and reaction mix flow rates in and Out of the CSTR, respectively, were controlled to maintain a constant average residence time of 12 minutes. The reaction mix temperature inside the CSTR was kept constant at 230° C. The reaction mix out of this first reaction zone was continuously fed to a devolatilization zone where solvent, unreacted material and by-products were removed from the product. The resulting Poly(CHA-co-BA-co-GMA) product was continuously fed to a second reaction zone. At the inlet of the second reaction zone the first reaction zone product was continuously admixed with a fresh feed of methacrylic acid (MAA). The MAA flow was kept constant at a suitable rate equivalent to 0.72 fresh-MMA/GMA-in-first product mole ratio. This reaction mix was continuously fed to a second reaction zone comprising the tubular reactor described in example 26. The temperature in this second reactor zone was controlled at 247° C. The available volume of this second reaction zone provided an average residence time of 15 minutes at the given feed flow rates described.

After an operation time longer than 10 residence times at the above conditions the MAA flow was increased first to a new constant suitable rate equivalent to 1.15 and then to 1.30 fresh-MMA/GMA-in-first product mole ratio. The rest of all process/product variables were kept as described above.

The characteristics of the first and second zone products thus continuously obtained are summarized in the following table.

TABLE 27

| | | | |
|---|---|---|---|
| 1st Zone (CSTR) Conditions | | | |
| CHA/BA/GMA (monomer ratio in feed w/w) | | 50/30/20 | |
| MEK/DTBP (% w/w with respect to total mix) | | 30/0.2 | |
| Reaction Temperature (° C.) | | 230 | |
| Average Residence Time (minutes) | | 12 | |
| Devolatilization Zone Temperature (° C.) | | 250 | |
| 1st Zone Product Characteristics | | | |
| Mn | | 1,532 | |
| Mw | | 2,560 | |
| Mw/Mn | | 1.68 | |
| Epoxy Value (mol/100 g) | | 0.13242 | |

| | A | B | C |
|---|---|---|---|
| 2nd Zone (Tube Reactor) Conditions | | | |
| MAA feed rate (as MAA/GMA mole ratio) | 0.72 | 1.15 | 1.30 |
| Reaction Temperature (° C.) | 247 | 247 | 247 |
| Average Residence Time (minutes) | 15 | 15 | 15 |
| 2nd Zone Product Characteristics | | | |
| Mn | 2,420 | 2,340 | 2,240 |
| Mw | 4,750 | 4,470 | 4,140 |
| Mw/Mn | 1.96 | 1.91 | 1.84 |
| Epoxy Value (mol/100 g) | 0.0370 | 0.00191 | 0.00133 |
| Unreacted MAA content in product (% w/w) | ND | 0.515 | 0.167 |
| Epoxide Conversion (%) | 71.6 | 98.5 | 99.0 |
| Average Double Bonds per Chain (Mn based) | 2.24 | 2.90 | 2.79 |

ND = lower than GC detection limit

This type of in-line modified acrylic polymer is a reactive polymer useful for UV/EB/Peroxide cure markets, hot-melt/pressure sensitive adhesives, in-mold coatings, and low cure temperature powder, high solids, and liquid coatings.

Example 28

Continuous Production of Dual Functional Acid/Hydroxyl Unsaturated Reactive Acrylic Polymers In this example, the first polymeric product continuously produced in the first reaction zone was a carboxylic acid functional polymer, which was continuously admixed with glycidyl methacrylate and the mixture was then continuously charged into the second reactor zone to obtain a dual functional acid/hydroxyl unsaturated reactive acrylic polymer.

A fresh feed mix comprised of approximately 41.9% cyclohexyl acrylate (CHA), 20.9% butyl acrylate (BA), 7% Acrylic Acid (AA), 30% methyl-ethyl ketone (MEK) and 0.2% di-tertiary butyl peroxide was continuously fed to a 300 cc CSTR. The reaction mixture was continuously removed from the CSTR. The fresh feed and reaction mix flow rates in and out of the CSTR, respectively, were controlled to maintain a constant average residence time of 12 minutes. The reaction mix temperature inside the CSTR was kept constant at 230° C. The reaction mix out of this first reaction zone was continuously fed to a devolatilization zone where solvent, unreacted material and by-products were removed from the product. The resulting Poly(CHA-co-BA-co-AA) product was continuously fed to a second reaction zone. At the inlet of the second reaction zone the first reaction zone product was continuously admixed with a fresh feed of glycidyl methacrylate (GMA). The GMA flow was kept constant at a suitable rate equivalent to 0.50 fresh-GMA/AA-in-first product mole ratio. This reaction mix was continuously fed to a second reaction zone comprising the tubular reactor described in Example 26. The temperature in this second reactor zone was controlled at 247° C. The available volume of this second reaction zone provided an average residence time of 15 minutes at the given feed flow rates described.

After an operation time longer than 10 residence times at the above conditions the GMA flow was increased first to a new constant suitable rate equivalent to 0.80 and then to 0.90 fresh-GMA/AA-in-first product mole ratio. The rest of all process/product variables were kept as described above.

The characteristics of the first and second zone products thus continuously obtained are summarized in the following table.

TABLE 28

| 1st Zone (CSTR) Conditions | | | |
|---|---|---|---|
| CHA/BA/AA (monomer ratio in feed w/w) | 60/30/10 | | |
| MEK/DTBP (% w/w with respect to total mix) | 30/0.2 | | |
| Reaction Temperature (° C.) | 230 | | |
| Average Residence Time (minutes) | 12 | | |
| Devolatilization Zone Temperature (° C.) | 250 | | |
| 1st Zone Product Characteristics | | | |
| Mn | 1,630 | | |
| Mw | 3,360 | | |
| Mw/Mn | 2.06 | | |
| Acid Value (mg-KOH/g) | 74.88 | | |
| | A | B | C |
| 2nd Zone (Tube Reactor) Conditions | | | |
| GMA feed rate (as GMA/AA mole ratio) | 0.50 | 0.80 | 0.90 |
| Reaction Temperature (° C.) | 247 | 247 | 247 |
| Average Residence Time (minutes) | 15 | 15 | 15 |
| 2nd Zone Product Characteristics | | | |
| Mn | 2,650 | 2,890 | 2,890 |
| Mw | 8,350 | 10,760 | 11,260 |
| Mw/Mn | 3.16 | 3.78 | 3.89 |
| Acid Value (mg-KOH/g) | 32.33 | 14.58 | 11.03 |
| Unreacted GMA content in product (% w/w) | ND | ND | ND |
| Acid Conversion (% based on Acid Value) | 54.4 | 78.4 | 83.5 |
| Average Double Bonds per Chain (Mn based) | 1.81 | 2.73 | 2.88 |

ND = lower than GC detection limit

This type of in-line modified acrylic polymer is a reactive polymer useful for UV/EB/Peroxide cure markets, hot-melt/pressure sensitive adhesives, in-mold coatings, and low cure temperature powder, high solids, and liquid coatings.

Example 29

Free Radically Formed Backbone Reacted with Castor Oil

A reaction mixture including 18.62% Styrene, 37.58% AMS, 33.02% AA, 7.64% EHA, and 3.14% DTBP was continuously fed to a CSTR. The residence time was maintained at 12 minutes and the reactor temperature was maintained at 230° C. to 250° C. The product was devolatilized and sent to a vented plug flow reactor (PFR) with a 90 minutes residence time. 42.8 parts Castor oil, with a hydroxy value of 161, and 0.02 parts lithium hydroxide monohydrate were added to 100 parts of the first polymer product in the PFR and maintained at 220 deg. C. The properties of the finished resin are below.

TABLE 29

| | Mn | Mw | Mz | Acid # |
|---|---|---|---|---|
| Example 29 | 2100 | 41000 | 264000 | 152 |

Example 30

Production of Mixture of Mono- and Di-Glycerides Reactive Polymer 88.2 parts soybean oil, 11.7 parts glycerol, and 0.04 part lithium hydroxide monohydrate were mixed together and reacted for 1 hour at 220° C. to produce a mixture of mono- and di-glycerides.

Example 31

Production of a Fatty Acid Modified Acrylic Reactive Polymer

A reaction mixture including 18.62% Styrene, 37.58% AMS, 33.02% AA, 7.64% EHA, and 3.14% DTBP was continuously fed to a CSTR. The residence time was maintained at 12 minutes and the reactor temperature was maintained at 230° C.–250° C. The product was devolatilized and sent to a vented PFR with approximately a 75 minutes residence time. 100 parts of the product from Example 30 were added to 100 parts of the first polymer product in the PFR and maintained at 220° C. The properties of the finished resin are below.

TABLE 30

| | Mn | Mw | Mz | Acid # |
|---|---|---|---|---|
| Example 31 | 2100 | 9100 | 665000 | 68 |

Example 32

Aqueous Dispersion of a Fatty Acid Modified Acrylic 150 grams of the resin from Example 31 was mixed with 11.0 grams of 28% ammonia solution and water and mixed for 1 hour at 76° C. The resulting dispersion had the following properties:

TABLE 31

| Test | Example 32 |
|---|---|
| Non-Vol | 20.9 |
| pH | 8.67 |
| Mn | 1906 |
| Mw | 34272 |
| Mz | 190832 |

To 100 parts of the resulting dispersion was added 0.6% Manganese Hydrocure™ (a 42% solution of manganese carboxylates in mineral spirits and surfactants from OMG Americas), 0.74% Cobalt Hydrocure™ (a 52% solution of cobalt naphthenate in mineral spirits and surfactants from OMG Americas), and 0.6% Dri-Rx™ (a 30% solution of 2,2 Bipyridyl in propylene glycol monomethyl ether from —OMG Americas). The solution was drawn down on a cardboard panel with a #8 wire rod. After drying for 1 day, the coating was tested for resistance to ethanol, 28% ammonia, and water, by placing a drop of each on the film and wiping it away after 1 minute of contact. The water had no effect on the film. Ethanol removed the film, and the ammonia removed half the film. The coating was checked one week later. Water had no effect. Ethanol removed approximately 30% of the film, and ammonia removed approximately 5% of the film. This shows the increased resistance of the film.

While only a few, preferred embodiments of the invention have been described, those of ordinary skill in the art will recognize that the embodiment may be modified and altered without departing from the central spirit and scope of the invention. Thus, the preferred embodiments described above are to be considered in all respects as illustrative and not restrictive, the scope of the invention being indicated by the following claims, rather than by the foregoing description, and all changes which come within the meaning and range of equivalents of the claims are intended to be embraced.

What is claimed is:

1. A continuous polymerization process for producing reactive polymers, comprising:
   a. continuously charging into a first reaction zone at least one functional monomer, wherein the functional monomer contains an amide group or an isocyanate group; and
   b. polymerizing the monomers to produce a first polymeric product having at least one functional group;
   c. directly charging into a second reaction zone the first polymeric product together with at least one modifier reactant having a functional group that is complementary to the functional group of the first polymeric product; and
   d. reacting at least a portion of the modifier reactant with at least one of the functional groups of the first polymeric product to produce a second polymeric product which incorporates at least a portion of the modifier reactant, such that the second polymeric product is a reactive polymer.

2. The continuous polymerization process of claim 1, wherein the second reaction zone is vented.

3. The continuous polymerization process of claim 1, wherein at least two different functional monomers are continuously charged into the first reaction zone.

4. The continuous polymerization process of claim 1, wherein (a) further comprises charging into the first reaction zone at least one solvent.

5. The continuous polymerization process of claim 1, wherein at least one modifier reactant is monofunctional.

6. The continuous polymerization process of claim 1, wherein at least one modifier reactant is multifunctional.

7. The continuous polymerization process of claim 1, wherein (a) further comprises charging into the first reaction zone at least one non-functional monomer.

8. The continuous polymerization process of claim 1, wherein (c) further comprises charging into the second reaction zone at least one free radical inhibitor.

9. The continuous polymerization process of claim 5, wherein the modifier reactant contains at least one functional group selected from the group consisting of hydroxyl, carboxylic acid, epoxy, amide, amine, ester, anhydride, aldehyde, ketone, isocyanate, vinyl, divinyl and allyl.

10. The continuous polymerization process of claim 7, wherein (a) further comprises continuously charging into the reactor at least one non-functional styrenic monomer.

11. The continuous polymerization process of claim 1, wherein the first reaction zone is held at a temperature between 120° C. and 310° C.

12. The continuous polymerization process of claim 1, wherein the second reaction zone is held at a temperature between 120° C. and 310° C.

13. The continuous polymerization process of claim 1, wherein the average residence time in the first reaction zone is less than one hour.

14. The continuous polymerization process of claim 1, wherein the average residence time in the second reaction zone is less than one hour.

15. The continuous polymerization process of claim 4, wherein the solvent is removed from the first polymeric product prior to (c).

16. The continuous polymerization process of claim 1, wherein the second reaction zone is free of solvent.

17. A continuous polymerization process for producing reactive polymers, comprising:
   a. continuously charging into a first reaction zone at least one functional monomer, wherein the function monomer contains an amide group;
   b. polymerizing the monomers to produce a first polymeric product having at least one functional group;
   c. directly charging into a second reaction zone the first polymeric product together with at least one modifiers reactant having a functional group that is complementary to the functional group of the first polymeric product, wherein the modifier reactant contains an amide group; and
   d. reacting at least a portion of the modifier reactant with at least one of the functional groups of the first polymeric product to produce a second polymeric product which incorporates at least a portion of the modifier reactant, such that the second polymeric product is a reactive polymer.

18. A continuous polymerization process for producing reactive polymers, comprising:
   a. continuously charging into a reaction zone at least one functional monomer selected from the group consisting of monoglycerides, diglycerides and combinations thereof; and b. polymerizing the monomers to produce a polymeric product, such that the polymeric product is a reactive polymer having hydroxyl functional side chains.

19. The continuous polymerization process of claim 18, wherein (a) further comprises charging into the first reaction zone at least one solvent.

20. The continuous polymerization process of claim 18, wherein (a) further comprises charging into the reactor at least one non-functional monomer.

* * * * *

UNITED STATES PATENT AND TRADEMARK OFFICE
CERTIFICATE OF CORRECTION

PATENT NO.        : 7,230,048 B1
APPLICATION NO.   : 09/648848
DATED             : June 12, 2007
INVENTOR(S)       : David D. Schatz et al.

Page 1 of 1

It is certified that error appears in the above-identified patent and that said Letters Patent is hereby corrected as shown below:

In Column 6, Line 21
Delete "Veova9" and replace with --Veova 9--.

In Column 10, Line 56
Delete "Such" after the words "in the art" and replace with --such--.

In Column 21, Line 29
Delete "FIEMA" with --HEMA--.

In Column 24, Line 53
Delete "cli-ester" after the word "acrylic" and replace it with --di-ester--.

In Column 26, Line 49
Delete "1 -lydroxyl" and replace it with --Hydroxyl--.

In Column 29, Line 40
Delete "(OMA)" and replace with --(GMA)--.

In Column 30, Table 27
For the Mn value, delete "1, 532" and insert --1,530--.

Signed and Sealed this

Seventeenth Day of June, 2008

JON W. DUDAS
*Director of the United States Patent and Trademark Office*